(12) United States Patent
Shigeta

(10) Patent No.: US 12,475,346 B2
(45) Date of Patent: *Nov. 18, 2025

(54) SYSTEM FOR INSPECTING GAMING CHIPS WITH RFID TAGS STORING IDENTIFICATION OF THE CHIPS

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 581 days.

This patent is subject to a terminal disclaimer.

(21) Appl. No.: 17/692,739

(22) Filed: Mar. 11, 2022

(65) Prior Publication Data

US 2022/0292321 A1 Sep. 15, 2022

(30) Foreign Application Priority Data

Mar. 12, 2021 (JP) ................ 2021-040865

(51) Int. Cl.
*G06K 19/04* (2006.01)
*G06K 7/10* (2006.01)
(Continued)

(52) U.S. Cl.
CPC ....... *G06K 19/047* (2013.01); *G06K 7/10297* (2013.01); *G06K 7/10366* (2013.01);
(Continued)

(58) Field of Classification Search
CPC ............ G06K 19/047; G06K 19/0723; G06K 7/10297; G06K 7/10366; G06V 10/25;
(Continued)

(56) References Cited

U.S. PATENT DOCUMENTS 9,378,605 B2 6/2016 Koyama
2007/0060311 A1 3/2007 Rowe et al.
(Continued)

FOREIGN PATENT DOCUMENTS

EP 3699877 A1 8/2020
JP 2000003420 A 1/2000
(Continued)

OTHER PUBLICATIONS

Japanese Office Action dated Feb. 7, 2023 issued in JP Application 2022-035523.
(Continued)

*Primary Examiner* — Omer S Khan
(74) *Attorney, Agent, or Firm* — NORTON ROSE FULBRIGHT US LLP

(57) ABSTRACT

An inspection system comprises: a placing surface having a plurality of areas for placing a plurality of gaming chips to be inspected one by one; an RFID reading system that reads the RFID tags of the gaming chips placed in each of the plurality of areas on the surface to obtain the type information and identification information for each of the areas; a chip recognition system that recognizes the presence or absence of at least one of the gaming chips placed in each of the plurality of areas of the placing surface; a control device that determines a status of the gaming chip in each of the areas of the placing surface based on the type and identification information obtained by the RFID reading system and the recognition results of the chip recognition system; and a display device that reflects the status determined by the control device for each area.

29 Claims, 27 Drawing Sheets

(51) Int. Cl.
*G06K 19/07* (2006.01)
*G06V 10/25* (2022.01)
*G07F 17/32* (2006.01)

(52) U.S. Cl.
CPC ......... *G06K 19/0723* (2013.01); *G06V 10/25* (2022.01); *G07F 17/3241* (2013.01)

(58) Field of Classification Search
CPC . G07F 17/322; G07F 17/3241; G07F 17/3248
See application file for complete search history.

(56) References Cited

U.S. PATENT DOCUMENTS

| | | | |
|---|---|---|---|
| 2008/0009339 A1 | 1/2008 | Pat et al. | |
| 2009/0075725 A1 | 3/2009 | Koyama | |
| 2009/0233698 A1 | 9/2009 | Koayama | |
| 2010/0007466 A1* | 1/2010 | Shoarinejad | H04L 9/3231 340/10.1 |
| 2012/0080845 A1 | 4/2012 | Emori et al. | |
| 2016/0008704 A1* | 1/2016 | Howland | G07F 17/326 273/274 |
| 2016/0093165 A1 | 3/2016 | Panambur et al. | |
| 2018/0144166 A1* | 5/2018 | Shigeta | A63F 9/24 |
| 2018/0336757 A1 | 11/2018 | Shigeta | |
| 2019/0172312 A1* | 6/2019 | Shigeta | G07F 17/3244 |
| 2019/0188958 A1* | 6/2019 | Shigeta | G07F 17/3248 |
| 2019/0347893 A1* | 11/2019 | Shigeta | G07F 17/3244 |
| 2020/0273287 A1 | 8/2020 | Shigeta | |
| 2020/0349806 A1 | 11/2020 | Shigeta | |
| 2020/0402357 A1 | 12/2020 | Moore et al. | |
| 2022/0101688 A1 | 3/2022 | Shigeta | |

FOREIGN PATENT DOCUMENTS

| | | |
|---|---|---|
| JP | 2009066172 A | 4/2009 |
| JP | 2009213732 A | 9/2009 |
| JP | 2012075781 A | 4/2012 |
| JP | 2018192108 A | 12/2018 |
| JP | 2019070622 A1 | 4/2019 |
| WO | 2016187164 A1 | 11/2016 |
| WO | 2020158014 A1 | 8/2020 |

OTHER PUBLICATIONS

EP Search Report dated Aug. 8, 2022 issued in EP Application 22161534.7.
International Search Report dated May 31, 2022 issued in PCT Application PCT/JP2022/010472.
Australian Examination Report No. 1 dated Jun. 2, 2022 issued in AU Application 2022201690.

* cited by examiner

| COLOR OF LAMP | STATUS | DESCRIPTION OF STATUS | STATUS DETAILS | DESCRIPTION OF STATUS DETAILS |
|---|---|---|---|---|
| GREEN | NORMAL | CORRECT INFORMATION IS READ FROM THE CHIP | NORMAL | NO PROBLEM |
| YELLOW | CAUTION | NO TAMPERING OR MALFUNCTION BUT SHOUD NOT BE USED | UNSTABLE | READABLE WITH STRONG RADIO WAVES BUT UNREADABLE WITH WEAK RADIO WAVES |
| | | | NON-ACTIVE | NOT HAVING BEEN ACTIVATED |
| | | | UNUSABLE | SUSPECTED COUNTERFEITING |
| ORANGE | COUNTERFEIT | CHIP IS COUNTERFEIT OR TAMPERED WITH | TAMPERING (RFID LEGITIMATE) | IMAGE READ DENOMINATION DOES NOT MATCH DB OR RFID READ DENOMINATION |
| | | | DB NOT REGISTERED (RFID NON-AUTHORIZED) | IDENTIFICATION INFORMATION NOT REGISTERED IN DB |
| RED | FAILURE | RFID TAG OF CHIP IS FAULTY OR MISSING | TAG FAILURE | RFID TAG IS READABLE BUT NOT DECIPHERABLE |
| | | | NO TAG | RFID TAG IS UNREADABLE |
| WHITE (NO LIGHT) | NO CHIP | CHIP NOT PLACED | – | – |

【NORMAL】

$10 ×4 = $ 40
$50 ×2 = $ 100
$100 ×4 = $ 400
$1,000×6 = $6,000

Total = $6,540

【ABNORMAL】

Broken or
No RFID ×2

Not Registered ×1

Fake ×1

【NORMAL】

$10 ×5 = $ 50
$50 ×3 = $ 150
$100 ×0 = $ 0
$1,000 ×7 = $7,000

Total = $7,200

【ABNORMAL】

Fake ×1

FIG.9

【NORMAL】

$10 ×3 = $   30
$50 ×3 = $  150
$100 ×2 = $  200
$1000×2 = $2,000

Total         = $2,380

【ABNORMAL】

No.3   UNSTABLE
No.8   BROKEN
No.9   APPEARANCE TAMPERING
No.11  NOT REGISTERED

FIG.15

SYSTEM FOR INSPECTING GAMING CHIPS WITH RFID TAGS STORING IDENTIFICATION OF THE CHIPS

CROSS-REFERENCE OF RELATED APPLICATIONS

This application claims the benefit of JP Pat. App. No. 2021-040865 filed Mar. 12, 2021, the contents of which are incorporated herein by reference.

FIELD

The present disclosure relates to an inspection system for gaming chips with built-in RFID tags.

BACKGROUND

Conventionally, gaming chips with built-in RFID tags have been known. The RFID tag stores information on the value of the gaming chip, identification information, etc., which enables detection of illegal gaming chip, inventory management of gaming chip, patron rating, etc. RFID technology is advantageous in that multiple RFID tags can be read simultaneously by using RFID readers, and a large number of gaming chips can be handled at once. For example, by reading the RFID tags of a plurality of gaming chips stored in a chip tray at once with an RFID reader, information such as the number of gaming chips stored in the chip tray and the total value can be obtained.

On the other hand, in the case of reading the RFID tags of multiple gaming chips using RFID technology, there is a problem that unauthorized gaming chips or gaming chips with faulty RFID tags cannot be detected. For example, among a large number of game chips (e.g., 1,000 coins) that are difficult to count, one gaming chip with a faulty RFID tag or without an RFID tag may be mixed in. In this case, even if the RFID reader reads 999 RFID tags, a system cannot know that there is one gaming chip whose RFID tag has not been read unless the system knows that there are 1,000 gaming chips.

In addition, even when it is found that there is a gaming chip with a faulty RFID tag or without an RFID tag mixed among a plurality of gaming chips, it is not easy to specify such a problematic gaming chip among the plurality of gaming chips. For example, if it is found that there is one problematic gaming chip among 1,000 gaming chips, it is necessary to inspect each gaming chip one by one to find the problematic gaming chip, which requires labor and time.

In addition, the following frauds are also possible: tampering with the appearance of a gaming chip to make it more expensive without tampering with the RFID tag; removing the RFID tag from one gaming chip and replacing it with the RFID tag of another gaming chip; and manufacturing a counterfeit gaming chip using an RFID tag removed from a genuine gaming chip. In such a fraud, there is no problem with the information stored in the RFID tag, so it is not possible to recognize such a gaming chip as a problematic (appearance tampered with) gaming chip only by reading the RFID tag.

SUMMARY

In view of the above problems, the present disclosure provides an inspection system for inspecting gaming chips for problems.

The present disclosure provides an inspection system for inspecting gaming chips having built-in RFID tags storing type information and/or identification information, and having type information and/or identification information expressed on a surface, the inspection system comprising: a placing surface having a plurality of areas for placing a plurality of gaming chips to be inspected one by one; an RFID reading system that reads the RFID tags of the gaming chips placed in each of the plurality of areas on the surface to obtain the type information and/or identification information for each of the areas; a chip recognition system that recognizes the presence or absence of at least one of the gaming chips placed in each of the plurality of areas of the placing surface; a control device that determines a status of the gaming chip in each of the areas of the placing surface based on the type and/or identification information obtained by the RFID reading system and the recognition results of the chip recognition system; and a display device that reflects the status determined by the control device for each area, wherein the status determined by the control device includes at least one of: (1) the gaming chip in the area is normal; (2) the gaming chip in the area has a broken RFID tag or does not have a built-in RFID tag; and (3) there are no gaming chips in the area, and the control device determines that: a gaming chip in an area where the gaming chip has been recognized by the chip recognition system but the RFID tag could not be read successfully by the RFID reading system is in the status (2); and an area where a gaming chip is not recognized by the recognition system is in the status (3).

The above inspection system may further comprise a storage device that stores at least the identification information of a plurality of the gaming chips, the control device may determine that a gaming chip for which the identification information read by the RFID reading system is not stored in the storage device is not in a normal state.

In the above inspection system, a plurality of placement areas formed by the plurality of areas in a row direction may be provided in a column direction, and the control device may determine that a gaming chip whose identification information read by the RFID reading system is different from the type information of the gaming chips on both sides of the row direction is not in a normal state.

In the above inspection system, a plurality of placement areas formed by the plurality of areas in a column direction may be provided in a row direction, and the control device may determine that a gaming chip whose identification information read by the RFID reading system is different from the type information of the gaming chips on both sides of the column direction is not in a normal state.

In the above inspection system, a plurality of placement areas formed by the plurality of areas in a column direction may be provided in a row direction, and the control device may determine that a gaming chip whose identification information read by the RFID reading system does not have a predetermined relationship with the type information of the gaming chips on both sides of the row direction is not in a normal state.

In the above inspection system, a plurality of placement areas formed by the plurality of areas in a column direction may be provided in a row direction, and the control device may determine that a gaming chip whose identification information read by the RFID reading system does not have a predetermined relationship with the type information of the gaming chips on both sides of the column direction is not in a normal state.

In the above inspection system, in the plurality of placement areas, the types of gaming chips to be placed may be defined, the control device may determine that the type of the gaming chip is not normal for each of the plurality of placement areas when the type information read by the RFID reading system does not correspond to the type defined in the placement area.

In the above inspection system, the control device may determine that a gaming chip in an area where the RFID tag reading is unstable is in a state that reading of the RFID tag is unstable.

In the above inspection system, the RFID reading system may be capable of changing strength of radio waves or magnetic fields for reading the RFID tag for each area, the control device may determine that a gaming chip in an area where the gaming chip can be read when the strength of radio waves or magnetic fields is strong and cannot be read when the strength of radio wave or magnetic fields is weak is in a state that reading of the RFID tag is unstable.

In the above inspection system, the chip recognition system may further recognize, using optical means, at least the type of the gaming chip placed on each of the plurality of areas of the placing surface, and the control device may determine that the gaming chip is not in a normal state if the type information read by the RFID reading system does not correspond to the type determined by the chip recognition system.

In the above inspection system, the chip recognition system may comprise: a camera that captures the gaming chip placed on the placing surface and generates a captured image; and a recognition device that recognizes the type of the gaming chip in each area by analyzing the captured image.

The above inspection system may further comprise a storage device that stores at least the type information of a plurality of the gaming chips in association with the identification information, wherein the control device may determine that a gaming chip for which the type recognized by the chip recognition system does not correspond to the type information associated in the storage device with the identification information read by the RFID reading system is not in a normal state.

In the above inspection system, the control device may determine that a gaming chip for which the type recognized by the chip recognition system does not correspond to the type information read by the RFID reading system is not in a normal state.

The above inspection system may further comprise a database that stores at least the identification information of a plurality of the gaming chips and activation information of the gaming chips associated with each other, wherein the control device may determine that a gaming chip in an area where the activation information associated in the database with the identification information read by the RFID reading system does not indicate an active state is not in an active state.

In the above inspection system, the gaming chip may store the identification information on the RFID tag and has further identification information by means other than the RFID tag, the storage device may further store reading history of the RFID reading system, and when the control device has determined that the RFID tag of the gaming chip is broken or the gaming chip does not have a built-in RFID tag, it may be possible to obtain the reading history of the gaming chips stored in the storage device using the identification information held by means other than the RFID tag.

In the above inspection system, the display may consist of a plurality of lamps corresponding to each of the plurality of areas, which indicates the status by a color.

In the above inspection system, the lamps may be provided in each of the plurality of areas of the placing surface.

In the above inspection system, the display device may be a display panel consisting of a plurality of pixels arranged in a two-dimensional array.

In the above inspection system, the display panel may show at least an area indicating contents of counterfeit and/or contents of fault.

In the above inspection system, the display panel may show at least the number of normal gaming chips.

In the above inspection system, the display panel may show, for each area, the type information read by the RFID reading system.

The above inspection system may further comprise a multiple placing surface for placing a plurality of the gaming chips; a second RFID reading system that reads the RFID tags of the plurality of gaming chips placed on the multiple placing surface to obtain the type information and/or the identification information.

The inspection system of another aspect of the present disclosure is an inspection system for inspecting gaming chips having built-in RFID tags storing type information and having type information expressed on the surface thereof, the inspection system comprising: a placement area consists of a plurality of areas for placing the plurality of gaming chips to be inspected one by one; an RFID reading system that reads the RFID tags of the gaming chips placed in each of the plurality of areas and obtains the type information for each area; a control device that determines a fraudulent gaming chip for each of the areas of the placing surface; a display device that displays determination results of the control device for each of the areas, wherein the control device determines that there is fraudulent gaming chip when a plurality of different type information is obtained from the plurality of areas.

In the above inspection system, a plurality of areas formed by the plurality of areas in a column direction may be provided in a row direction, or a plurality of areas formed by the plurality of areas in the row direction are provided in the column direction, and the control device may determine for each of the plurality of the areas whether a plurality of the type information is obtained from the plurality of areas.

In the above inspection system, when a plurality of different type information is obtained from the plurality of area, the control device may determine that the gaming chip in the area from which a type information different from the type information of majority is obtained is the fraudulent gaming chip.

The inspection system of another aspect of the present disclosure is an inspection system for inspecting a plurality of gaming chips having a built-in RFID tag that stores at least type information, the inspection system comprising: a placing surface having a plurality of areas for placing the plurality of gaming chips to be inspected one by one; an RFID reading system that respectively reads the RFID tags of the gaming chips placed on each of the plurality of areas of the placing surface; and a display device that displays the type information read by the RFID reading system for each area.

BRIEF DESCRIPTION OF DRAWINGS

FIG. 5 is a table showing examples of the types of states of gaming chips as determined by the controller of the first embodiment of the present disclosure.

FIG. 7 shows an example of the aggregate display area in the example of FIG. 6.

FIG. 9 shows an example of the aggregate display area in the example of FIG. 8.

FIG. 15 shows a variation of the liquid crystal display of the second embodiment of the present disclosure.

DESCRIPTION OF THE PREFERRED EMBODIMENTS

Multiple embodiments of the present disclosure are described below. However, the present disclosure is not limited to the following embodiments, and each technical element, function, etc. of the multiple embodiments can be arbitrarily combined. In the following, a circular chip will be used as an example of a gaming chip. The gaming chip is also referred to as a chip.

An inspection system in this embodiment is a system for inspecting gaming chips received from players at the time of exchange at cages, tables, etc., and gaming chips received by collecting those from players who have lost a game. The inspection system in this embodiment can also be used to inspect the gaming chip owned by the casino in chip trays at cages and tables at any given time. The inspection system in this embodiment has a placement table on which the gaming chip can be placed one by one, and the placement table is equipped with a chip reader. In addition, the table can be used to place five pieces of gaming chips together by type.

Figure 1:
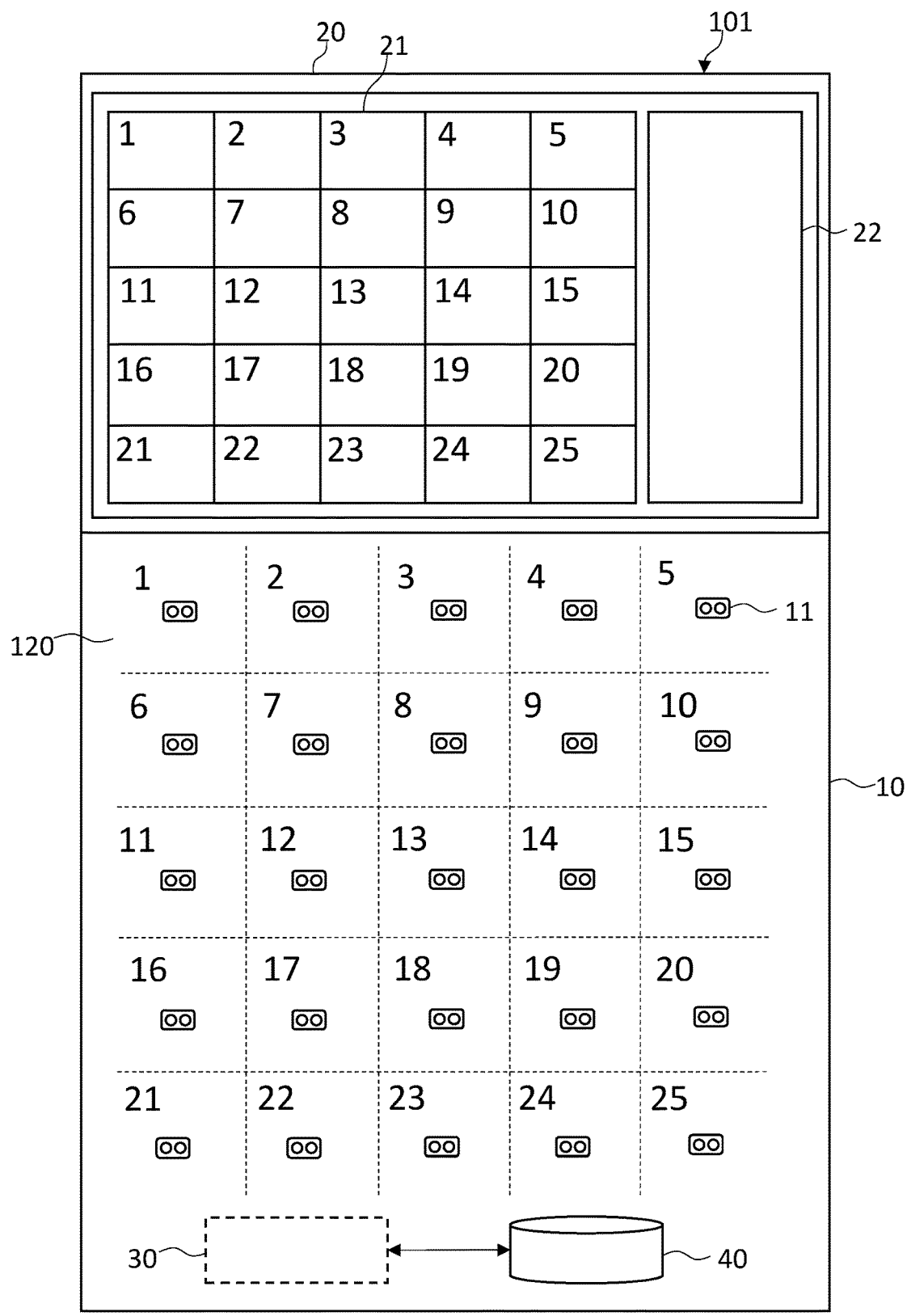
FIG. 1 shows a configuration of the inspection system of the first embodiment of the present disclosure.

FIG. 1 shows a configuration of an inspection system of the first embodiment of the present disclosure. The inspection system 101 is a system for inspecting gaming chips, and includes: a placement table 10 having a placing surface 120; a display device 20 for displaying the results of the inspection; a control device 30 for performing calculations for the inspection; and a storage device 40 for storing information on the gaming chips.

The top surface of the placement table 10 is a placing surface 120. On the placing surface 120 a plurality of chip placement areas are demarcated, in each of which one of a plurality of gaming chips to be inspected are placed. In the example shown in FIG. 1, the placing surface 120 has 25 chip placement areas in five rows and five columns. One chip placement area accepts one chip. These chip placement areas may be divided by printing lines on the placing surface 120, or adjacent chip placement areas may be separated by walls of a few millimeters in height. Alternatively, each chip placement area may have an indentation for accepting the gaming chip.

Figure 2:
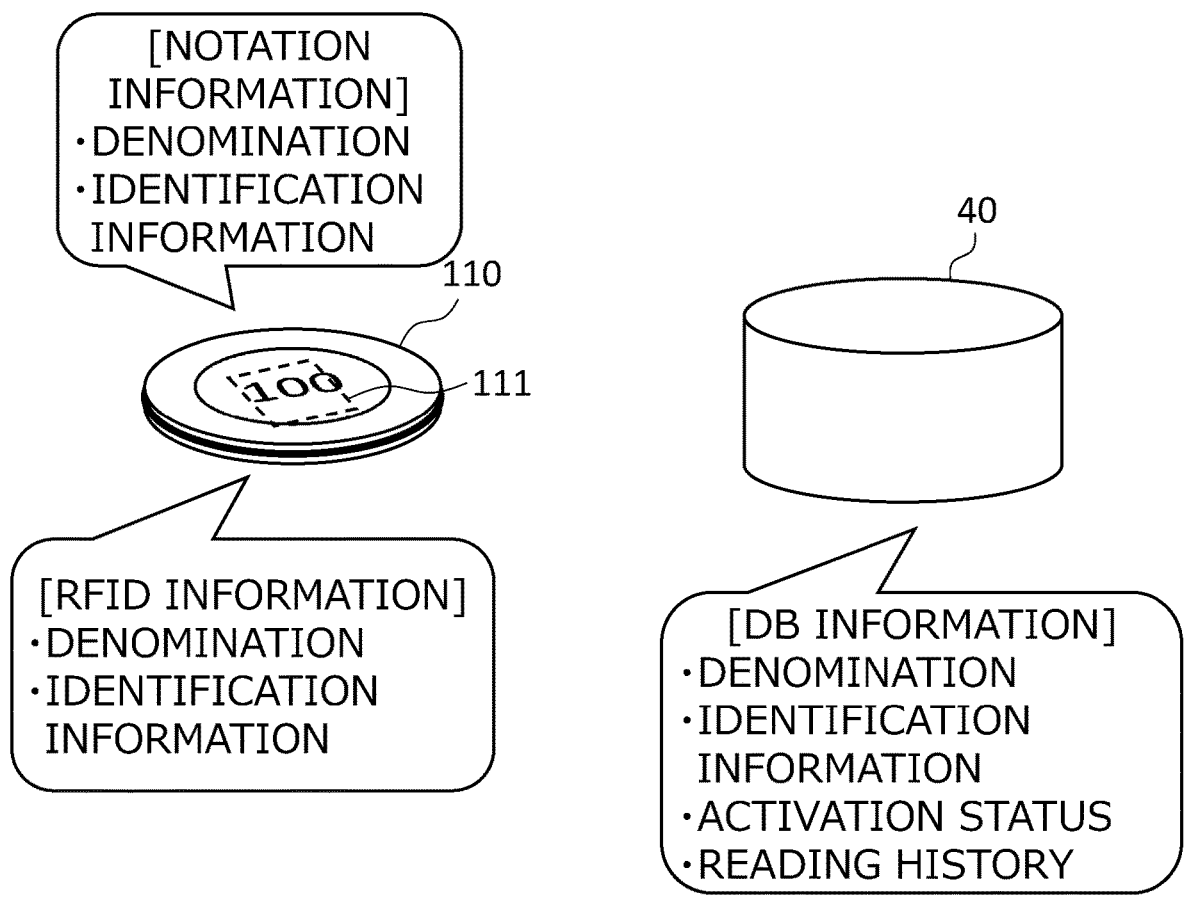
FIG. 2 shows data structure of the gaming chip and storage device of the first embodiment of the present disclosure.

FIG. 2 shows data structure of the gaming chip and storage device of the first embodiment of the present disclosure. A number indicating the type (denomination) of the gaming chip is written on the front and back of the gaming chip 110. The identification information (e.g., identification number) unique to the gaming chip 110 is further indicated on the front and back of the gaming chip. This identification information may be printed with an ink that cannot be observed under natural light, such as ultraviolet reactive ink or infrared absorbing ink. In this case, the identification information may be made visible by irradiating the gaming chip with ultraviolet or infrared light using an ultraviolet lighting device or an infrared lighting device.

The gaming chip 110 has a built-in RFID tag 111. The RFID tag 111 stores the type (denomination) and identification information of the gaming chip. The RFID tag 111 may also store other information such as the casino in which it is used, manufacturing information, owner's history information, etc.

The storage device 40 stores information for each gaming chip, such as type (denomination) information, identification information, activation status, and reading history. The activation status is valid in the storage device 40 when the gaming chip is brought into the casino and can be used in the casino, and is invalid (deactivated) in the storage device 40 when the gaming chip is no longer used in the casino due to malfunction, deterioration, suspicion of fraud, or theft. The reading history indicates locations of the RFID readers where the gaming chip was read in chronological order. In other words, the reading history is a history of the movement of the gaming chip within the casino, and is information that associates the player or dealer with the gaming chip.

The storage device 40 is updated periodically. In case that the storage device 40 or the inspection system 101 including the storage device 40 is connected to a communication network, the updated data may be sent to each storage device 40 via the communication network.

Referring back to FIG. 1, each of the plurality of chip placement areas on the placing surface 120 has an object detection sensor 11 that detects the presence of a gaming chip placed thereon. Each object detection sensor 11 consists of a laser illuminator and a laser receiver. The object detection sensor 11 outputs an ON signal when an object (gaming chip) is present in the chip placement area.

In addition, each of the plurality of chip placement areas of the placing surface 120 of the placement table 10 has a chip placement area that reads each of the RFID tags 111 of the gaming chips 110 placed therein to obtain type and identification information for each chip placement area. The RFID reading system is equipped with an antenna to read information from RFID tags and an RFID reader that controls the antenna.

Figure 3:
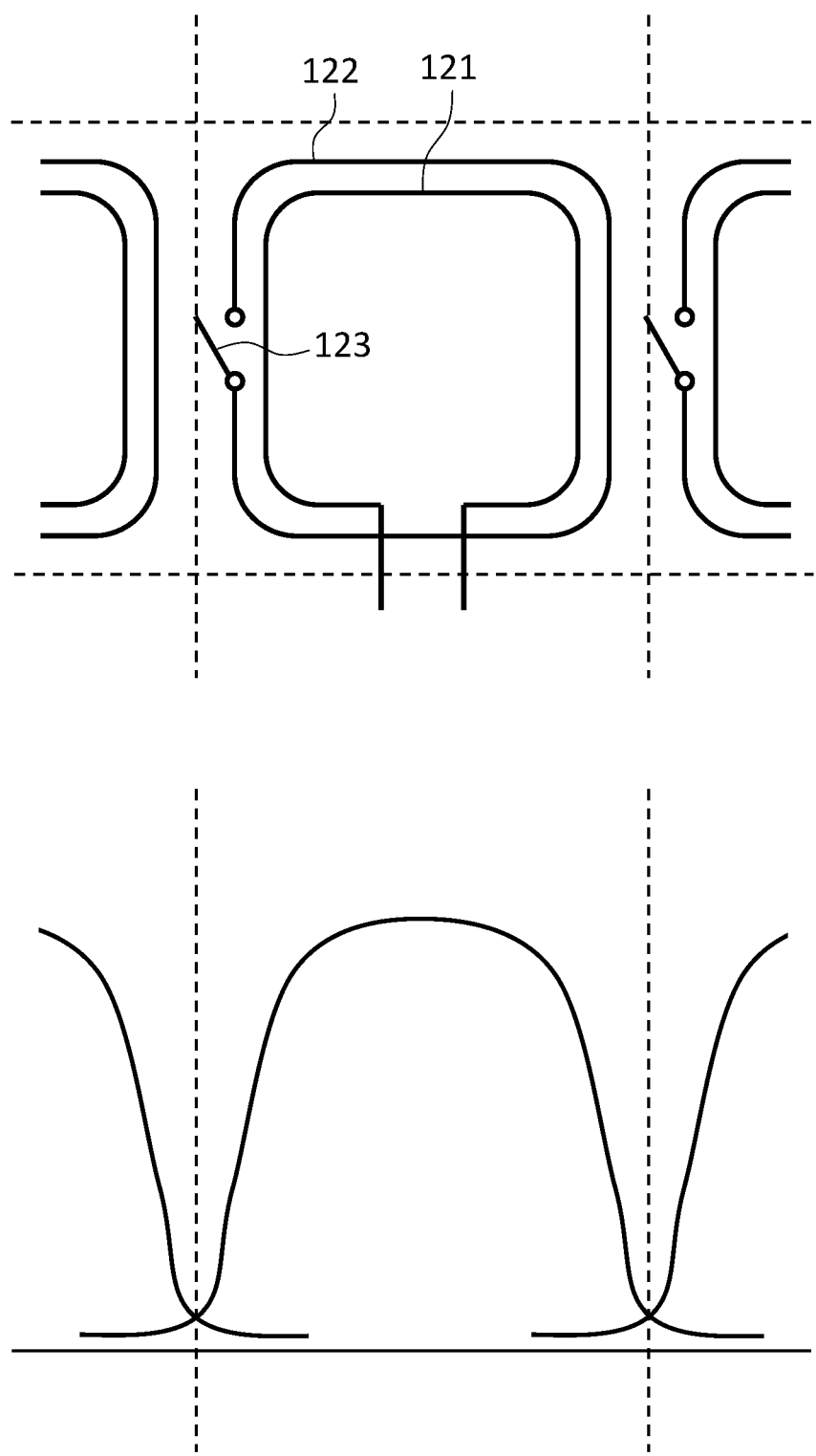
FIG. 3 shows an example of an antenna and its radio wave or magnetic field intensity distribution on a placement table of the first embodiment of the present disclosure.

FIG. 3 shows an example of an antenna and its radio wave or magnetic field intensity distribution on a placement table of the first embodiment of the present disclosure. In this example, a reading antenna 121 and a jamming antenna 122 are provided for each chip placement area. The reading antenna 121 generates radio waves or magnetic fields to supply power to the RFID tag 111 and reads information from the RFID tag 111.

The jamming antenna 122 generates a radio wave or magnetic field induced by the radio wave or magnetic field from the reading antenna 121 in the surrounding chip placement area, and shapes the radio wave or magnetic field of the reading antenna 121 in the surrounding chip placement area. As shown in the lower part of FIG. 3, the radio wave or magnetic field formed by the reading antenna 121 in each chip placement area has a predetermined strength only within the chip placement area and becomes weak outside the chip placement area, so that the reading antenna 121 is prevented from reading the RFID tag 111 of the gaming chip 110 outside the chip placement area.

By using the combination of the reading antenna 121 and the jamming antenna 122, the gaming chips 110 placed in each chip placement area cannot be read by the reading antennas 121 implemented in the other chip placement areas, and as a whole, this makes it possible to read the RFID tag 111 for each chip placement area separately.

The reading antenna 121 has its positive and negative poles connected to the RFID reader, and current is applied from the RFID reader. The jamming antenna 122 is equipped with a switch 123. When the switch 123 is closed, a closed loop is formed, and when the switch 123 is opened, the closed loop is opened. The RFID reader controls the opening and closing of the switch of each jamming antenna 122.

The RFID reader activates the reading antennas 121 in each chip placement area one by one in sequence, so that the RFID reader reads the RFID tags in order in a time-division manner for multiple chip placement areas. In synchronization with the switching of the chip placement area to be read, the RFID reader closes the switches of the jamming antennas 122 of the chip placement areas around the chip placement area to be read to turn on the jamming effect. This will prevent the reading antenna 121 of the chip placement area to be read from reading the RFID tags in the surrounding chip placement areas.

Figure 4:
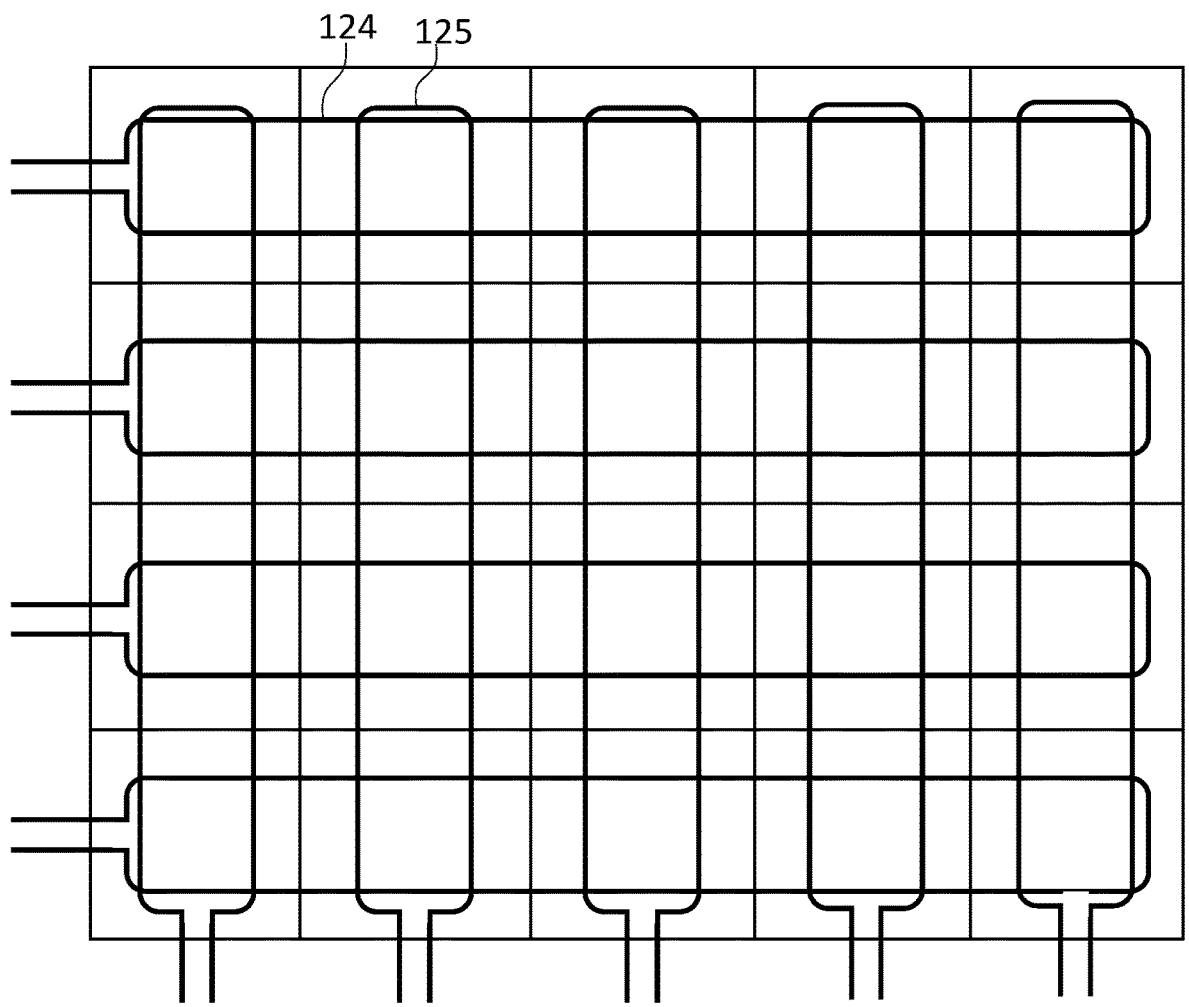
FIG. 4 shows another example of an antenna installed on the placement table of the first embodiment of the present disclosure.

FIG. 4 shows another example of an antenna installed on the placement table of the first embodiment of the present disclosure. In this example, elongated reading antennas 124 and 125 are provided in each row and each column of the chip placement area arranged in a two-dimensional matrix. Although not shown, a jamming antenna may be provided corresponding to each reading antenna 124 and 125 as in FIG. 3.

In this example, the number of reading antennas 124, 125 can be reduced compared to the case where reading antennas 121 are placed in each chip placement area as in the example in FIG. 3. The RFID reader uses multiple reading antennas 124 and 125 in sequence to read RFID tags in rows or columns.

For example, the reading antenna 124 of the first row can be used to read RFID tags 11 of the gaming chips 110 in the chip placement areas of the first row of the placement table 10. Also, the reading antenna 125 of the first column can read the RFID tags 111 of the gaming chips 110 in the chip placement area of the first column of the placement table 10. The RFID tag that is read in the first row and also in the first column is determined as the RFID tag of the gaming chip 110 placed in the chip placement area of the first row and first column among the chip placement areas arranged in a two-dimensional matrix.

In this way, the RFID reader reads the plurality of rows one by one and the plurality of columns one by one, and by referring to the read data, the RFID tag 111 of each chip placement area is identified.

Returning to FIG. 1, the control device 30 determines the status of the gaming chip 110 based on the type information obtained by the RFID reading system and the output of the plurality of object detection sensors 11 for each chip placement area. For this purpose, the control device 30 obtains the reading results for each chip placement area from the RFID reading system, and also obtains the detection results from each of the plurality of object detection sensors 11. As a result, the control device 30 obtains, for each chip placement area, the information stored in the RFID tag 11 and the information on the presence or absence of gaming chip.

FIG. 5 is a table showing examples of the types of states of gaming chips as determined by the controller of the first embodiment of the present disclosure. The status determined by the control device 30 can be broadly divided into five categories: normal, caution, counterfeit, failure, and no chip.

First of all, for the chip placement area in which the gaming chip has been detected by the object detection sensor 11 but has not been read properly by the RFID reading system, the control device 30 determines the status is that the RFID tag 111 is broken or the gaming chip has no built-in RFID tag 111.

More specifically, first, the control device 30 determines that there is no chip in the chip placement area when no gaming chip is detected by the object detection sensor.

In addition, if some information can be read from the RFID tag 111, but the information cannot be deciphered (e.g., identification information can be obtained, but other information cannot be obtained), the control device 30 determines that the data stored in the RFID tag 111 is corrupted. If no information can be read from the RFID 111, the control device 30 determines that the RFID tag 111 is either completely malfunctioning or that the RFID tag 111 is not built-in.

If the identification information read by the RFID reading system is not stored in the storage device 40, the control device 30 determines that the state of the gaming chip is counterfeit. In this case, the possibility that the RFID tag 111 embedded in the gaming chip 110 is not a genuine one is suspected.

The control device 30 determines that the gaming chips are counterfeit when the identification information read by the RFID reading system is different from the type information of the adjacent gaming chips in the row direction. For the gaming chips at both ends of each row, since there are no adjacent gaming chips, the control device 30 determines that the gaming chip at both end is in a counterfeit state when the identification information read by the RFID reading system is different from the type information of a gaming chip adjacent in the row direction and the identification information of the adjacent gaming chip is the same as the identification information of the further adjacent gaming chip.

The control device 30 determines that the gaming chip 110 which the identification information read by the RFID reading system does not have a predetermined relationship (for example, a relationship in which when comparing one row with the row above it, the denominations in those rows are the same, or the denomination in the lower row is greater than the denomination in the higher row.) with the type information of other gaming chips 110 adjacent to it in the row direction is in a counterfeit state.

In this embodiment, when placing gaming chips in each chip placement area of the placement table 10, the rule is that the types in the same row are the same and the gaming chips with smaller amounts are placed in the upper row. Therefore, as described above, when the types of adjacent gaming chips in the same row are different, and when the denomination of the gaming chip in the lower row is smaller than the denomination of the gaming chip in the upper row, or when the denomination of the gaming chip in the upper row is larger than the denomination of the gaming chip in the lower row, it is suspected that the appearance of the gaming chip 110 has been tampered with or that the RFID tag 111 of the gaming chip 110 has been implanted in another gaming chip 110.

The control device 30 determines that the reading of the RFID tag 111 is unstable for the gaming chip in a chip placement area in which reading of the RFID tag 111 is unstable. To make this determination, the RFID reading system can change the strength of the radio wave or magnetic field used to read the RFID tag 111 in each chip placement area. The control device 30 determines that the RFID tag 111 is in an unstable state for a gaming chip in a chip placement area in which the RFID tag 111 can be read when the strength of the radio wave or magnetic field is increased but cannot be read when the strength of the radio wave or magnetic field is decreased.

Information on unstable, malfunctioning, suspicious chips, and unusual gaming chips shall be stored in a database to be shared. For example, if a chip is determined to be unreadable in the chip tray (or any other location other than the placement table 10), it is stored in the database, and when it is read by the placement table 10, the information in the database is used to determine whether the chip is unreadable. If the database contains a black list of unstable, failed, suspicious, or unusual chips, the system can alert the user when the gaming chip listed in the black list is read.

For gaming chips in the chip placement area for which the activation status associated with the identification information read by the RFID reading system is not valid in the storage device 40, the control device 30 determines that the gaming chip is not in a valid status.

The control device 30 shall determine that a gaming chip in a state without any of the defined problems is in a normal state.

Returning to FIG. 1, the display device 20 consists of a display panel with pixels arranged in a matrix. On its display screen, a per-area display area 21 showing the results of the state determination for each chip placement area and a total display area 22 showing the aggregate values of the determination results are displayed.

Figure 6:
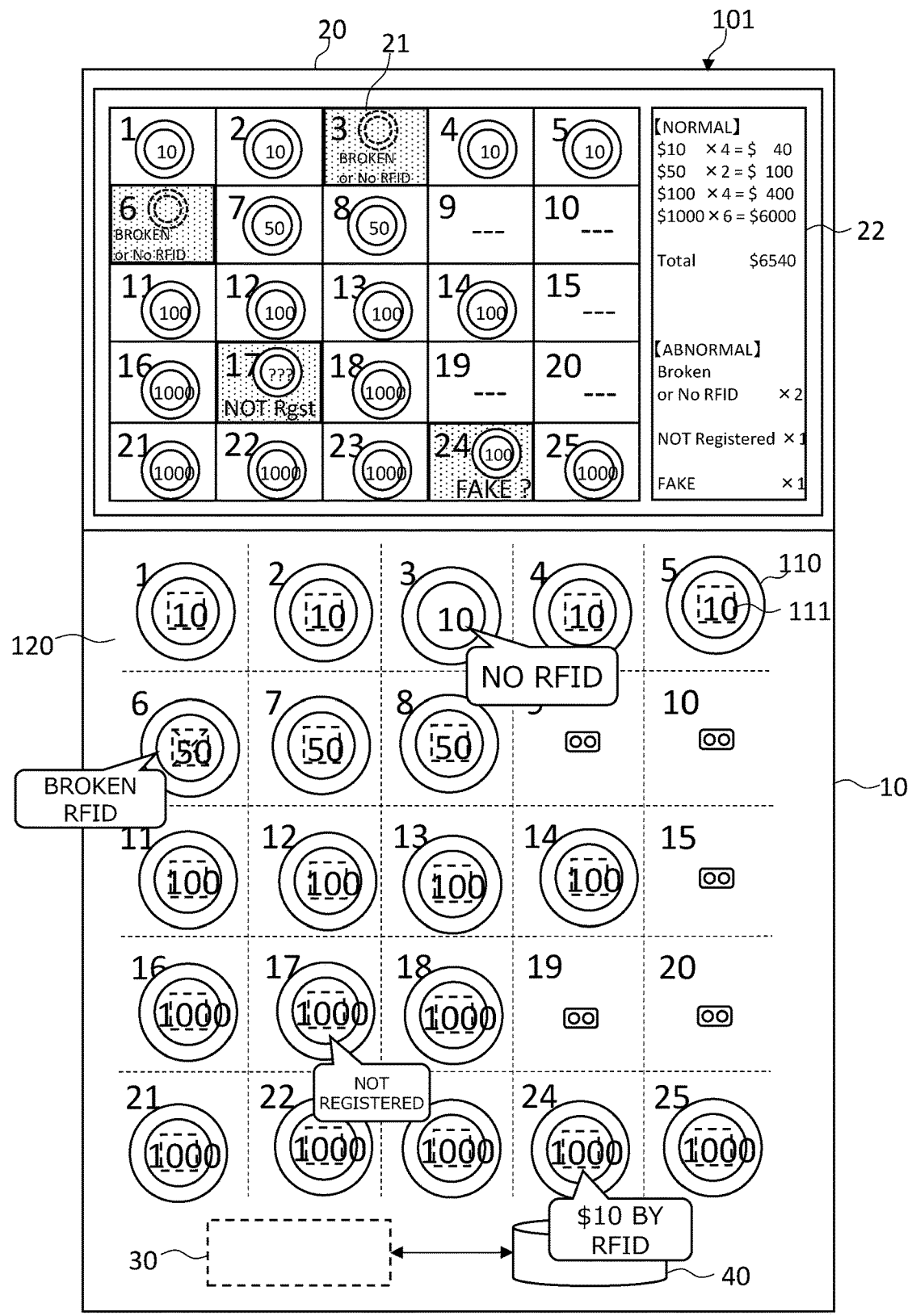
FIG. 6 shows an example of the use of the inspection system of the first embodiment of the present disclosure.

FIG. 6 shows an example of the use of the inspection system of the first embodiment of the present disclosure. In this example, five $10 chips are placed in the first row, left-justified, three $50 chips are placed on the second row, left-justified, four $100 chips are placed in the third row, left-justified, and three $1,000 chips are placed in the fourth row, left-justified, and five $1,000 chips in the fifth row, left-justified.

As shown in FIG. 6, in this embodiment, when placing one gaming chip in each chip placement area, the gaming chips shall be placed so that the type (denomination) of the same row is the same and the denomination is larger (or equal) the lower the row. The person conducting the inspection will place the gaming chips in the chip placement area while checking the appearance of the gaming chips, i.e., the denominations indicated on the front and back of the gaming chips.

In this example, the $10 chip located in area number 3 is a gaming chip with no built-in RFID tag 111, and the $50 chip located in area number 6 is a gaming chip with a malfunctioning RFID tag 111, and the $1,000 chip in area number 17 is a gaming chip in which the identification information stored in the RFID tag 111 is not stored in the storage device 40, and the $1,000 chip in area number 24 is a gaming chip whose RFID tag is that of a $10 gaming chip but whose appearance is that of a $1,000 chip, and whose appearance has been tampered with.

For area number 3 and area number 6, the object detection sensor 11 detects the gaming chip, but the RFID reading system does not read the information, so it is determined that the RFID tag 111 is faulty or that the gaming chip does not contain an RFID tag 111.

The area with the corresponding area number in the per-area display area 21 will display such an error. Specifically, the area in question is displayed in red and also indicates in text that the RFID tag 111 is faulty or that it is a gaming chip that does not contain an RFID tag 111 is displayed.

For the area of area number 17, a gaming chip is detected by the object detection sensor 11 and the RFID tag 111 is read by the RFID reading system, however, it is determined that the identification information is not stored in the storage device 40. In this case, the area with the corresponding area number in the per-area display area 21 will display an indication of such an error. Specifically, the area in question is displayed in orange, and the fact that the RFID tag 111 or identification information has not been registered is indicated in text. In this case, even if information on the denomination of the relevant gaming chip can be identified, the denomination is not displayed.

For the area of area number 24, a gaming chip is detected by the object detection sensor 11 and the RFID tag 111 is read by the RFID reading system, however, it is determined that the denomination of the gaming chip associated with the identification information in the storage device 40 does not match the denomination of adjacent gaming chips. Specifically, the denomination of the gaming chip associated with the identification information read from the RFID tag in area number 24 is $10 while the denominations of the gaming chips of the two adjacent areas (area number 23 and area number 25) are $1,000.

This situation can occur, for example, when the appearance of a legitimate $10 chip is tampered with to make it look like a $1,000 chip, or when a legitimate $10 chip RFID tag 111 is used to create a counterfeit $1,000 chip. The dealer can visually check the difference between the information based on the RFID tag 111 and its appearance to see if it was placed by mistake by the dealer, and if it was, he can reposition it.

In this case, such an error is displayed in the area with the corresponding area number in the per-area display area 21. Specifically, the area in question is displayed in orange, and the fact that the gaming chip in question is counterfeit is also displayed in text. In this case, the denomination information associated with the identification information read from the RFID tag 111 is displayed in the corresponding area in the per-area display area 21.

The system above refers the storage device 40 using the identification information read from the RFID tag 111 to identify the denomination information associated with the identification information and compares the identified denomination information with those of the adjacent areas. Instead of or in addition to this, the system may determine whether the denomination read from the gaming chip is different from those of the gaming chips in the adjacent areas.

The aggregate results of the readings and determinations for the plurality of chip placement areas are displayed in the aggregate display area 22. FIG. 7 shows an example of the aggregate display area in the example of FIG. 6. In the examples of FIG. 6 and FIG. 7, the gaming chips determined to be normal include: four $10 chips, two $50 chips, four $100 chips, and six $1,000 chips, therefore, the sub-total amount for each denomination ($40 by $10 chips, $100 by $50 chips, $400 by $100 chips, and $6,000 by $1,000 chips) and the total amount $6,540 is displayed in the aggregate display area 22.

In addition, for the gaming chips 110 that are fraudulent or abnormal, the details of the fraud or abnormality and the number of such gaming chips are shown. In the example shown in FIGS. 6 and 7, it is displayed that the number of gaming chips that are determined to have a malfunction in the RFID tag 111 or to be missing the RFID tag 111 is two, the number of gaming chips determined to be unregistered is one, and the number of gaming chips determined to be counterfeit is one.

Figure 8:
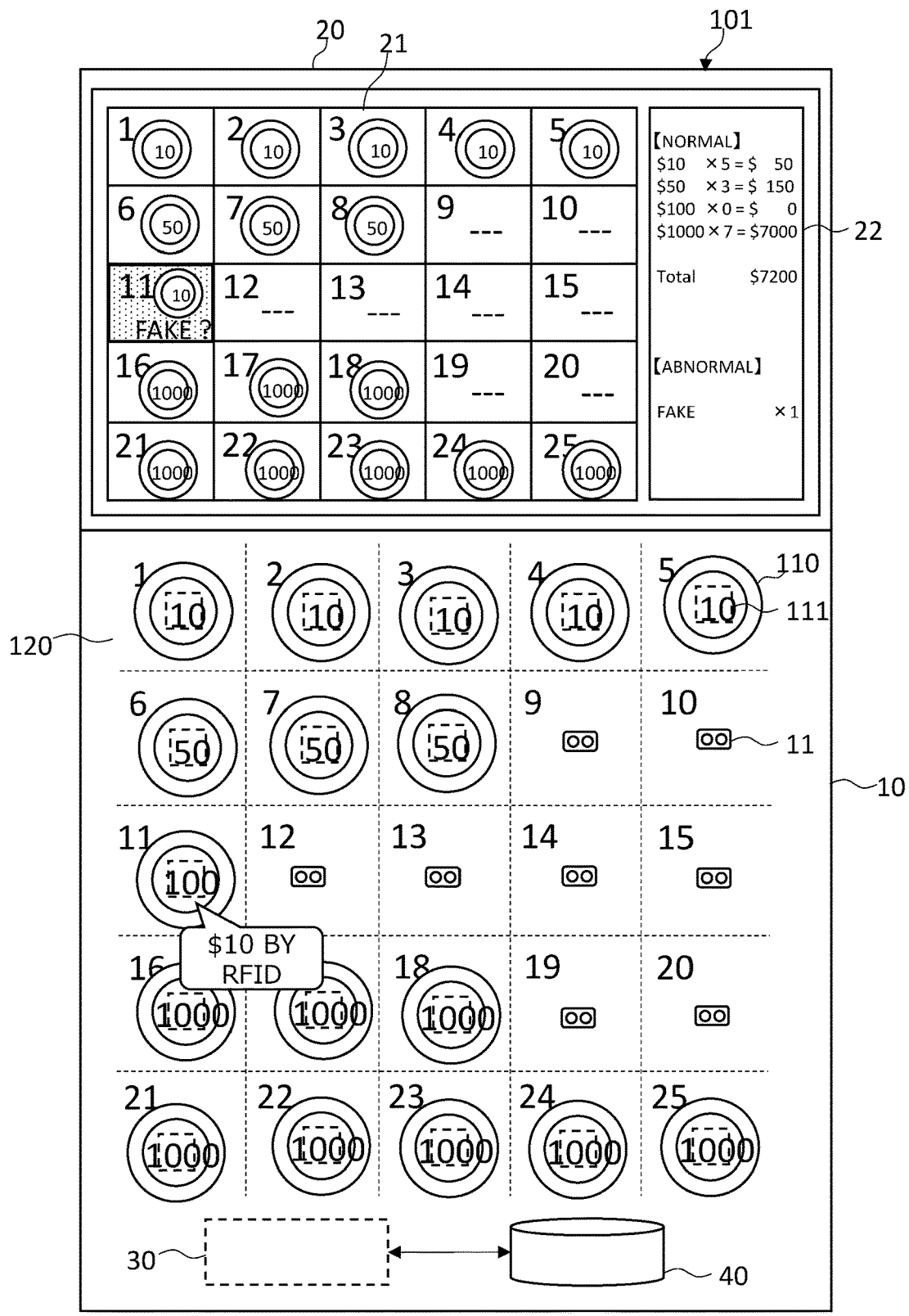
FIG. 8 shows another example of the use of the inspection system of the first embodiment of the present disclosure.

FIG. 8 shows another example of the use of the inspection system of the first embodiment of the present disclosure. In the example of FIG. 8, only one $100 chip is placed. In such a case, it is not possible to compare the $100 chip with the denomination of other chips in the same row. However, for area number 11, $50 chips are placed in the row (row 2) above the row (row 3) containing the area in which the $100 chip is placed, and $1,000 chips are placed in the row (row 4) below the row (row 3) containing the area in which the $100 chip is placed.

The control device 30 determines whether the denomination of the gaming chip in the area number 11 has the predetermined relationship described above in relation to the denominations read in the rows above and below the area number 11. In the example shown in FIG. 8, for area number 11, the denomination associated with the identification information read by the RFID reading system for the area number 11 is $10. In this case, the predetermined relationship with the lower row (row 4) is satisfied because the denomination of area number 11 is smaller than that of the lower row, the predetermined relationship with the upper row (row 2) is not satisfied because the denomination of area number 11 is smaller than the upper row. Therefore, the control device 30 determined that the denomination $10 identified for area number 11 is abnormal and the gaming chip is counterfeit.

FIG. 9 shows an example of the aggregate display area in the example of FIG. 8. In the examples of FIGS. 8 and 9, since the gaming chips that have been determined to be normal are: five $10 chips, three $50 chips, no $100 chips, seven $1,000 chips, the aggregate display area 22 shows the sub-total for each denomination ($50 by $10 chips; $150 by $50 chips; $0 by $100 chips; $7,000 by $1,000 chips) and the total amount $7,200.

In addition, for the gaming chips 110 that are fraudulent or abnormal, the details of the fraud or abnormality and the number of such gaming chips are shown. In the example of FIG. 8 and FIG. 9, it is shown that the number of gaming chips determined to be counterfeit is one.

In the above embodiment, the dealer places the gaming chips 110 one by one in the chip placement area by visually confirming the area to place the gaming chip, in accordance with the rule that the same denomination of gaming chips 110 are placed in each row and that the higher the row, the smaller the denomination of gaming chips 110. Instead, the rule may be set such that: the same denomination of gaming chips 110 shall be placed in each row, and the higher the row, the larger the denomination of gaming chips 110; the same denomination of gaming chips 110 shall be placed in each column, and the left column has a smaller denomination of gaming chip 110 than the right column; or the same denomination of gaming chips 110 shall be placed in the same row, and the right column has a smaller denomination of gaming chip 110 than the left column.

In the above embodiment, the rule requires to place the same denomination of gaming chips 110 in each row and to place a smaller denomination of gaming chips in the upper row, and the control device 30 determines that the gaming chip 110, which differs in denomination from both sides, is a counterfeit. Instead, the control device 30 may determine the majority denomination to be positive and the minority denomination to be counterfeit when the same row contains multiple denominations of gaming chips 110.

In this case, the control device 30 first determines whether or not the same row contains a plurality of denominations of gaming chip 110. Then, if there is a plurality of denominations of gaming chip 110, the control device 30 determines which denomination is more and which denomination is less to determine which denomination of gaming chip 110 is counterfeit. In addition, in case that a rule is set to place the same denomination of gaming chips 110 on the entire placement table 10, when multiple denominations of gaming chips 110 are included, the majority denomination may be determined to be positive and the minority denomination to be counterfeit.

In addition, a rule may be set that gaming chips 110 of the same denomination are placed in the same row, but denomination magnitude of the gaming chips 110 between each row is arbitrary. In this case, the control device 30 uses the denomination of the gaming chip 110 in the leftmost column (first column) of each row as the reference, and determines, in each row, whether each of denominations of the gaming chips 110 in the second and subsequent rows is the same as the denomination of the gaming chip 100 in the first row.

Figure 10:
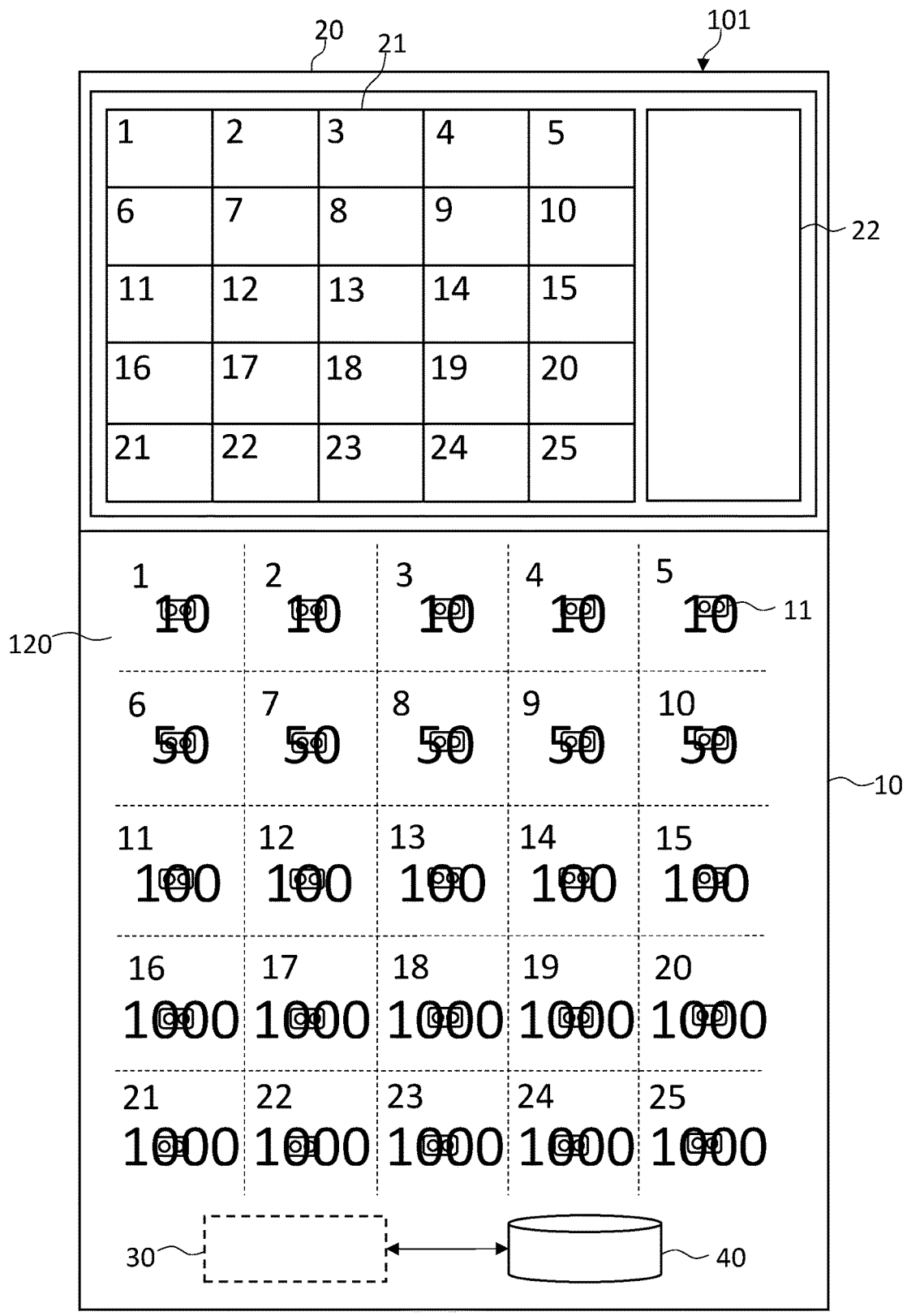
FIG. 10 shows an example of an inspection system of a variation of the first embodiment of the present disclosure.

FIG. 10 shows an example of an inspection system of a variation of the first embodiment of the present disclosure. In this example, for each of the plurality of chip placement areas of the placement table 10, the denomination of gaming chips to be placed therein is assigned in advance. Each chip placement area on the placing surface 120 has a number printed on it that indicates the denomination of gaming chip to be placed there. The dealer and other casino staff place gaming chip one by one in each chip placement area according to these numbers.

If a denomination associated in the storage device 40 with the identification information read from each chip placement area is different from the denomination allocated to that chip placement area, the control device 30 determines that the gaming chip in the chip placement area is counterfeit.

Figure 11:
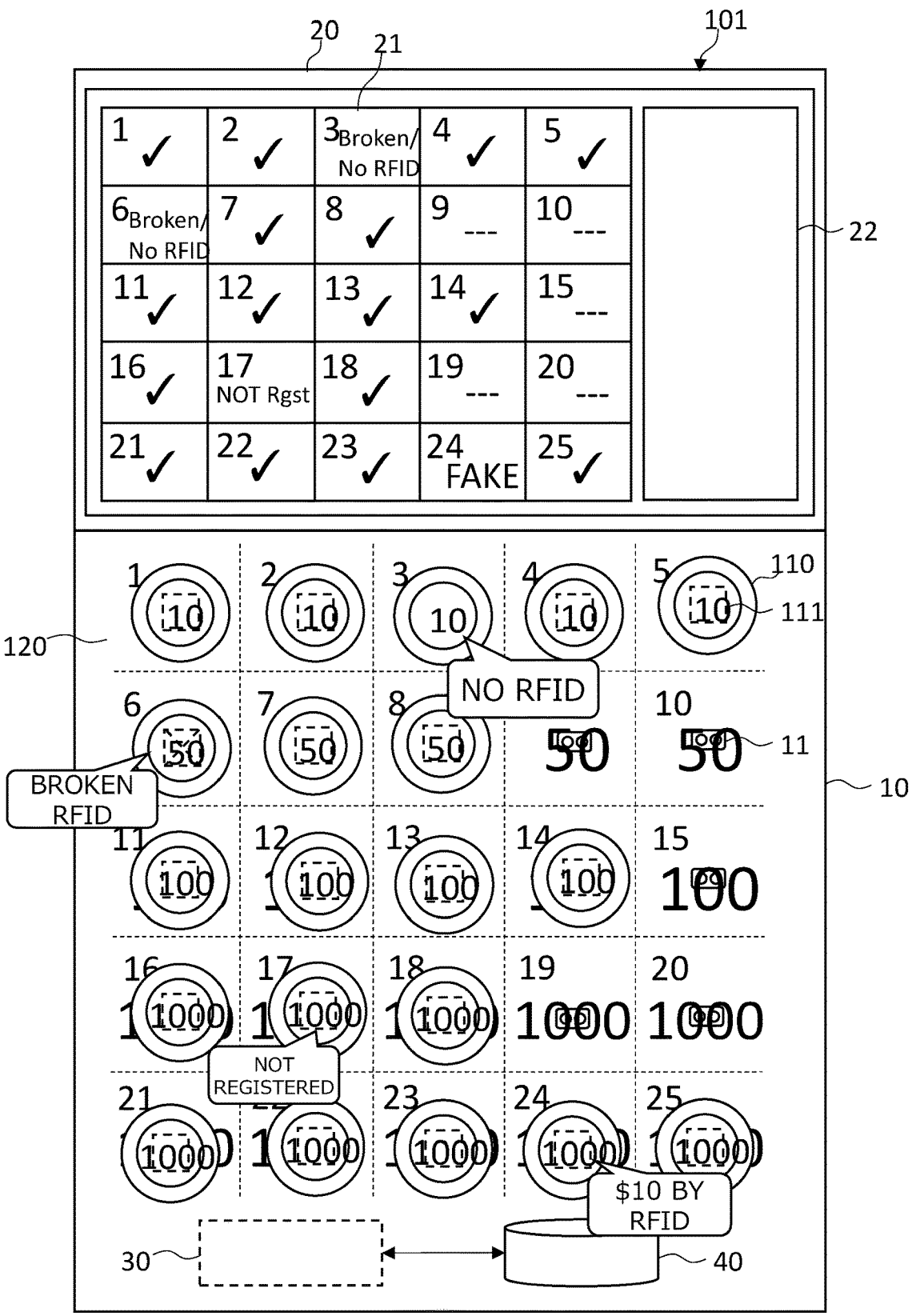
FIG. 11 shows an example of the use of the inspection system of the variation of the first embodiment of the present disclosure.

FIG. 11 shows an example of the use of the inspection system of the variation of the first embodiment of the present disclosure. In this variation, the denomination assigned to area number 24 is $1,000, but the storage device 40 has an denomination of $10 associated with the identification information read from area number 24 by the RFID reading system. In other words, the denomination identified based on the RFID tag 111 is different from the denomination assigned to the chip placement area. Therefore, the control device 30 determines that the gaming chip is counterfeit.

The dealer or the other staff of casino places this gaming chip 110 in the chip placement area of area number 24 because its appearance is $1,000. Therefore, the denomination of gaming chip identified by the appearance and the denomination identified by the RFID tag do not match, and the gaming chip is determined to be counterfeit.

As described above, according to the inspection system of the first embodiment of the present disclosure and its variations, a plurality of chip placement areas are provided on the placement table 10, and one gaming chip is placed in each chip placement area for inspection. Each chip placement area is equipped with a reading antenna for reading the RFID tag 111 and an object detection sensor 11. The reading antenna 121 reads the RFID tag 111 of the gaming chip 110 in each chip placement area, and the object detection sensor 11 detects the presence or absence of the gaming chip 110 in each chip placement area.

With this configuration, for a chip placement area for which the object detection sensor 11 detects the presence the gaming chip 110 (the gaming chip 110 is placed there) but RFDI tag 111 cannot read, it is determined that the RFID tag 111 of the gaming chip is malfunctioning, or the gaming chip does not have a built-in RFID tag 111.

In the first embodiment, the system is equipped with a storage device 40 that stores the identification information of the gaming chips used in the casino, and the control device 30 determines whether or not the identification information read from each chip placement area by the RFID reading system is stored in the storage device 40. If the read identification information is not stored in the storage device 40, the control device 30 determines that the gaming chip 11 is not registered.

Furthermore, in the first embodiment, a predetermined rule is established for the placement of the denomination of the gaming chip on the placing surface 120, and the dealer or the staff of casino recognizes the denomination of the gaming chip from the appearance of the gaming chip and places the gaming chip in accordance with the rules, or the denomination of the gaming chip to be placed in each chip placement area is assigned in advance, and the dealer or casino staff recognizes the denomination of the gaming chip from the appearance of the gaming chip and places the gaming chip corresponding to the assigned denomination in each chip placement area.

The control device 30 identifies the denomination associated with the identification information read by the RFID reading system by referring to the storage device 40, and determines whether or not the identified denomination corresponds to the rule or the assigned denomination described above. In this way, it is possible to determine that a gaming chip whose appearance differs from the denomination identified by the RFID tag 111 is counterfeit.

In the above embodiment, the RFID reading system reads the identification information from the RFID tag 111 of the gaming chip 110, and the control device 30 identifies the denomination associated with the identification information by referring to the storage device 40, thereby identifying the denomination based on the RFID tag 111 of the gaming chip 110. In addition to or instead of this, the RFID reading system reads the denomination information from the RFID tag 111 and identifies the denomination based on the RFID tag 111, and the control device 30 may identify the denomination of the gaming chip 110 based on the denomination information read by the RFID reading system. In this case, the storage device 40 may be omitted. Alternatively, when the denomination of the gaming chip 110 is identified based on the denomination stored in the storage device 40, the denomination information stored in the RFID tag 111 may be omitted.

In addition, the control device 30 may determine whether the denomination information stored in the RFID tag 111 corresponds to the denomination information associated with the identification information read from the RFID tag 111 in the storage device 40 (indicating the same denomination) to determine whether the gaming chip 110 or the RFID tag 111 is counterfeit or tampered with.

The determination of each state shown in FIG. 5 is further explained below. The RFID reading system can change the strength (hereinafter referred to as "antenna strength") of the radio wave or magnetic field emitted from the reading antenna 121. The RFID reading system can change the antenna strength and conduct readings repeatedly in plural times to read the gaming chip 110 placed in each chip placement area of the placement table 10. For example, the RFID reading system reads with two levels of strong and weak antenna strength.

If the control device 30 may read an RFID tag 111 when the antenna strength is strong, but may not read the RFID tag 111 when the antenna strength is weak, the control device 30 determines that the gaming chip 110 in that chip placement area is unstable.

The activation status is stored in the storage device 40 as described above. If the activation status of the identification information read from the RFID tag 111 is not valid (e.g., not yet activated, not yet validated, or has been deactivated) in the storage device 40, the control device 30 determines that the gaming chip is not valid.

In addition, though fraudulent gaming chips and fraudulent activities are monitored in each situation in casino, there is a case that it cannot be determined that it is a fraudulent gaming chip, but it may be considered suspicious. In addition, the gaming chips involved in the fraudulent activities should also be carefully used afterwards, and such gaming chips may be disabled, although counterfeiting, etc. is not confirmed.

For such suspicious gaming chips, the storage device 40 can store information on the unavailability of the gaming chips in association with the identification information of the gaming chips. When the identification information is read by the RFID reading system in the inspection system 101, if the identification information is marked as unusable in the storage device 40, the control device 30 determines that the gaming chip is unusable.

In the above embodiment, when any information is read from the gaming chip 110, the control device 30 determines that the RFID tag 111 is broken or the RFID tag 111 is missing. However, if some information can be read from the RFID tag 111, it can be determined that the RFID tag 111 is present, but no valid information is stored in the RFID tag, in the case that, for example, the TID (Tag ID) area of the RFID tag 111 can be read but data in the EPC (Electronic Product Code) area or user area is broken, the control device 30 determines that the RFID tag 111 (or data therein) has a failure.

Figure 12:
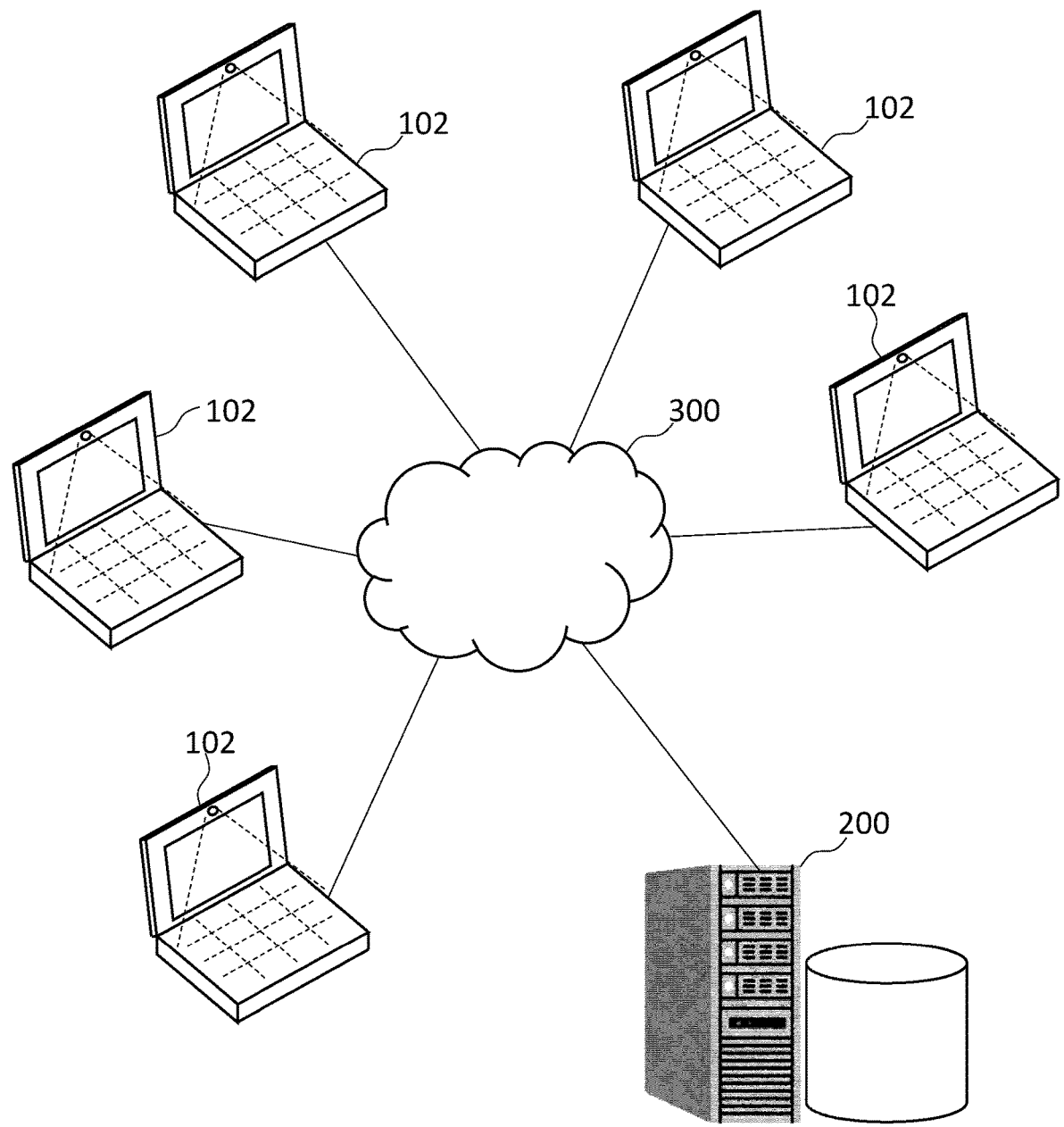
FIG. 12 shows a configuration of a system of the second embodiment of the present disclosure.

FIG. 12 shows a configuration of a system of the second embodiment of the present disclosure. The system consists of a plurality of inspection systems 102 and a chip management system 103. The plurality of inspection systems 102 and the chip management system 200 are communicably connected via a communication network 3.

The chip management system 200 is installed in a casino facility, and an intranet may be used as the communication network 300, or the chip management system 200 may be connected to a plurality of inspection systems 102 in the casino facility via the Internet 300. The chip management system 200 updates the denomination information, reading history, activation and deactivation information, unstable chip information, unusable information, and other information associated with the identification information of each gaming chip. This information is periodically shared with each inspection system 102 via the communication network 300. In the first embodiment, various information associated with the identification information is stored in the storage device 40, and the control device 30 of each inspection system 101 refers to the storage device 40 in the same inspection system 101 to determine whether the identification information is registered, etc. However, in this embodiment, the inspection system 102 is not equipped with a storage device 40, and the control device 30 makes an inquiry to the chip management system 200 via the communication network 300 regarding the identification information read from the RFID tag 111 of the gaming chip 110 by the RFID reading system to determine whether the identification information is registered, etc.

Each inspection system 102 may be equipped with a storage device 40. In this case, each inspection system 102 does not need to connect to the chip management system 200 via the communication network 300 for each inspection, and the control device 30 can access the storage device 40 to perform the inspection. In this case, the storage device 40 of each inspection system 102 is periodically updated by the chip management system 200 via the communication network 30.

Figure 13:
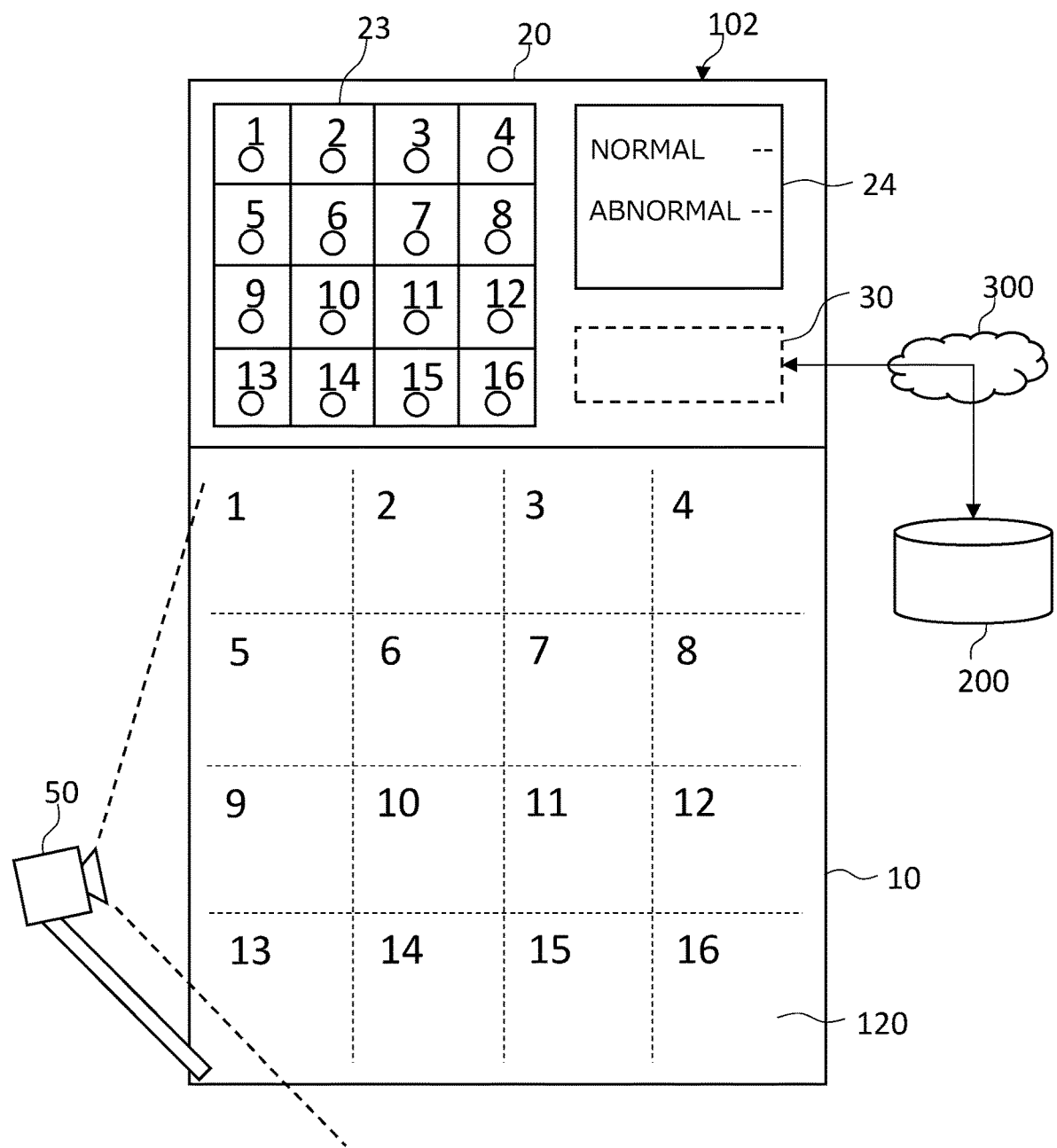
FIG. 13 shows a configuration of the inspection system of the second embodiment of the present disclosure.

FIG. 13 shows a configuration of the inspection system of the second embodiment of the present disclosure. In the description of the inspection system 102 of this embodiment, the elements with the same functions as those of the inspection system 101 of the first embodiment are given the same numbers and are omitted from the description as appropriate.

The inspection system 102 is equipped with a placement table 10, a display device 20, a control device 30, and a capturing device 50. The inspection system 102 is equipped with a placement table 10, a display device 20, a control device 30, and a capturing device 50. In addition, although not shown in FIG. 13, the inspection system 102 is equipped with an RFID reading system similar to the inspection system 101. The control device 30 in this embodiment has a communication function and communicates with the chip management system 200. In this embodiment, the placement table 10 has a total of 16 chip placement areas of 4 rows and 4 columns.

In the inspection system 102, each chip placement area is not provided with an object detection sensor 11, but instead with a capturing device 50 that captures the placement table 10. The capturing device 50 is a camera system consisting of an optical system such as lens, etc., an image sensor, an image processor, and other devices.

The capturing device 50 captures the gaming chips 110 placed in each chip placement area of the placement table 10 from above the placement table 10. The camera 20 generates a full-color image. Not only one but also two or more capturing devices 50 may be provided. In the case where the identification information or other information is written in invisible ink such as ultraviolet reaction ink or infrared absorption ink on the gaming chip 110, an ultraviolet light or infrared light to make such invisible ink visible may be attached to the capturing device 50.

The control device 30 has an image recognition function that recognizes the gaming chips in each chip placement area and determines their types (denomination) by performing image recognition on the captured images. In other words, the control device 30 also functions as an image recognition device. For this image recognition, machine learning methods such as neural networks and SVM, etc. can be used. These machine learning methods are designed and trained to recognize the gaming chip 110 at any rotation angle. In the image recognition, the system extracts and recognizes the gaming chip 110 by generating a difference image from the image of the placing surface 120 without the gaming chip 110 and the image of the placing surface 120 with the gaming chip 110. Also, the differential image may be used to detect only the presence or absence of the gaming chip 110 and inspect the gaming chip 110 in the same manner as in the first embodiment.

The control device 30 may identify the denomination of the gaming chip 110 by recognizing a number written on the gaming chip 110 through image recognition. Alternatively, the control device 30 may recognize the denomination of the gaming chip by extracting features from the entire image of the gaming chip through self-learning without specifying the features for identification. Since the gaming chip 110 represents different colors and patterns for each denomination in addition to the number representing the denomination, those colors and patterns may also be features for identifying the denomination.

As described above, when the identification information is written in visible or invisible ink on the gaming chip 110, the control device 30 also reads this identification information based on the captured image. In this case, recognition by a neural network such as deep learning may also be performed.

The display device 20 is equipped with a per-area lamp section 23 and a liquid crystal display section 24. In the per-area lamp section 23, a plurality of lamps are provided in an arrangement corresponding to the chip placement area of the placing surface 120 of the placement table 10. The lamps are equipped with LED light-emitting elements of three primary colors, and can emit any color.

In this embodiment, the status of the gaming chip determined by the control device 30 is expressed by the lighting color of the lamps in the per-area lamp section 23. In this embodiment, the control device 30 determines that each chip placement area is in one of the following states: "normal,"

"caution," "counterfeit," "failure," or "no chip," and lights the lamp in green (normal), yellow (caution), orange (counterfeit), or red (failure), respectively. If there is no chip, the lamp will not light up.

The chip management system 200 functions as a database server that stores data similar to the data stored in the storage device 40 of the first embodiment. In other words, the chip management system 200 stores the identification information, denomination information, activation status, reading history, unusable flag, etc. of all the gaming chips 110 used in the casino, and can identify the denomination information, activation status, etc. associated with the identification information using the identification information as a key.

If the gaming chip 110 is unstable, inactive, or unusable, the control device 30 determines that it is "caution" and turns on the lamp of the area number of the gaming chip in yellow. The yellow blinking pattern may be changed according to the difference between unstable, ineffective, and unusable. For example, the lamp may be lit for unstable, blinking for ineffective and unusable, and thus the blinking pattern may be different for ineffective and unusable.

The control device 30 may store information to that effect in the chip management system 200 in association with the identification information when the reading of the RFID tag 111 of the gaming chip 110 is unstable. For the gaming chip for which the unstable information is stored in the chip management system 200 in this manner, the control device 30, when it obtained the identification information from the RFID reading system thereafter, can refer the chip management system 20 using the identification information as a key thereby determines that the reading of the RFID tag 111 is unstable.

In addition, when the denomination recognized from the capturing image by the image recognition function and the denomination obtained by referring the chip management system 200 using the identification information read from the RFID tag 1111 by the RFID reading system as a key do not correspond each other, the control device 30 determines that the appearance of the gaming chip has been tampered with. When the identification information read from the RFID tag 111 by the RFID reading system is not stored in the chip management system 200, the control device 30 determines that the identification information of the RFID tag 111 of the gaming chip is unregistered.

If the control device 30 determines that the appearance has been tampered with or that the RFID tag 111 is unregistered, the control device 30 determines that the status of the gaming chip 110 is "counterfeit" and lights the lamp of the area number of the gaming chip in question in orange. The orange blinking pattern may be changed according to the difference between tampering with the appearance and unregistered identification information. For example, the lamp may be lit when the appearance is tampered with and blink when the RFID tag is not registered.

If no RFID tag 111 reading result is obtained from the RFID reading system for the chip placement area where the gaming chip was recognized as a result of image recognition of the captured image, the control device 30 may determine the RFID tag 111 of the gaming chip 110 in the chip placement area is faulty or that the gaming chip 110 in the chip placement area does not have an RFID tag 111, and determines that the status of the gaming chip 110 is "failure," and turns on the lamp of the area number of the gaming chip 110 in red.

The control device 30 determines that the chip placement area in which no gaming chip was recognized as a result of image recognition for the captured image is "no chip" and does not light the lamp of the area number of the chip placement area concerned.

As described above, the control device 30 has a lamp control function that controls the lighting of each lamp in the per-area lamp section 23 according to the result of the determination.

The liquid crystal display section 24 displays a tally of the results of the inspection of each of the plurality of chip placement areas. Specifically, the liquid crystal display section 24 displays the number of gaming chips determined to be "normal" and the total number of gaming chips determined to be "cautioned," "counterfeit," or "failure," i.e., the number of illegal or abnormal gaming chips, respectively.

Figure 14:
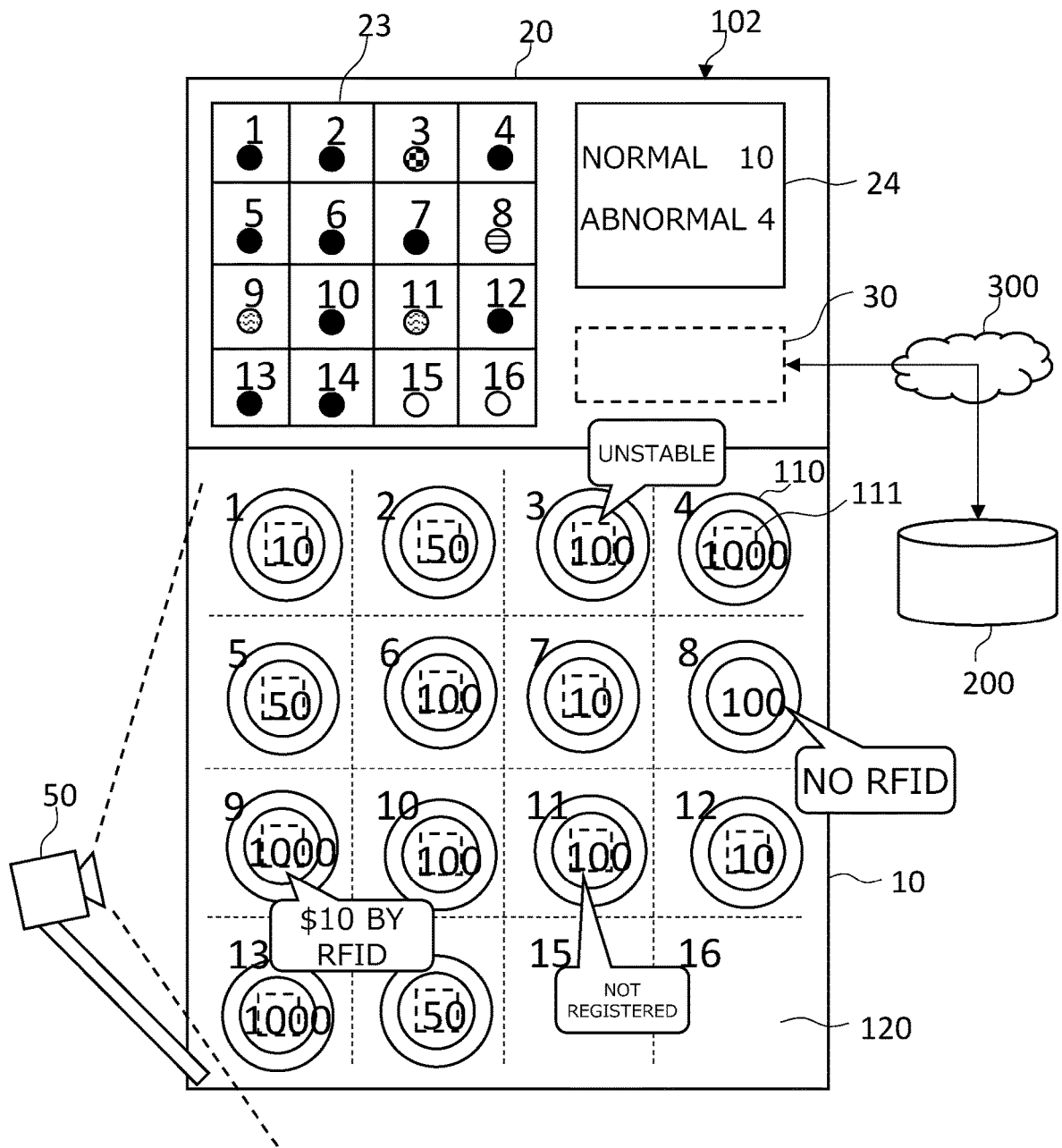
FIG. 14 shows an example of the use of the inspection system of the second embodiment of the present disclosure.

FIG. 14 shows an example of the use of the inspection system of the second embodiment of the present disclosure. In this example, the control device 30 determines that the reading of the gaming chip 110 in area number 3 is unstable and is in a state of "caution," and lights the lamp for area number 3 in the per-area lamp section 23 in yellow.

In addition, the control device 30 recognizes that there is a $100 chip in area number 8 from the captured image and also receives a result from the RFID reading system that the RFID tag 111 cannot be read from the gaming chip 110 in area number 8, thereby determines that the RFID tag 111 is in a state of "failure" and turns on the lamp of area number 8 in the per-area lamp section 23 in red.

In addition, the control device 30 obtains the identification information read from the RFID reading system for area number 9, makes an inquiry to the chip management system 200 using this identification information as a key, and obtains the information of $10 as the information of the denomination associated with this identification information. The control device 30, on the other hand, recognizes from the captured image of area number 9 that the gaming chip 110 is a $100 chip. Since the denomination information stored in the chip management system 200 ($10) differs from the denomination information recognized from the captured image ($100), the control device 30 determines that the gaming chip 110 is a "counterfeit" whose appearance has been tampered with, and turns on the lamp of area number 9 in the per-area lamp section 23 in orange.

In addition, the control device 30 obtains the identification information read from the RFID reader system for area number 11, and makes an inquiry to the chip management system 200 using this identification information as a key. When the control device 30 receives the result from the chip management system 200 that the identification information is unregistered, it determines that the gaming chip 110 is a "counterfeit" using an unregistered RFID tag and lights the lamp of area number 11 in the per-area lamp section 23 in orange.

In addition, since the control device 30 recognizes the gaming chip 110 in area numbers 1, 2, 4 to 7, 10, 12 to 14, as a result of image recognition of the captured images, and there is no problem with any of the above, the control device 30 determines that these gaming chips 110 to be "normal" and turns on the lamps of the area numbers 1, 2, 4-7, 10, 12-14 in the per-area lamp section 23 in green. As for area numbers 15 and 16, since no gaming chip 110 is recognized as a result of image recognition of the captured image, the control device 30 does not light the lamps of area numbers 15 and 16.

FIG. 15 shows a variation of the liquid crystal display of the second embodiment of the present disclosure. As shown in FIG. 15, the liquid crystal display section 24 shows the number and subtotal amounts for each denomination of normal gaming chips 110 and the total amount of normal gaming chips 110. The area number and the nature of the fraud or abnormality may be indicated for the fraudulent or abnormal gaming chips 110.

In the examples of FIGS. 14 and 15, as described above, area number 3 is determined to be unstable, and area number 8 is determined to have RFID failure or no RFID, and area number 9 is determined to have been tampered with in appearance, and area number 11 is determined to have an unregistered RFID tag, so the respective contents are displayed on the liquid crystal display section 24.

As described above, according to the inspection system 102 of the present embodiment, the denomination of gaming chip is recognized from the appearance of the gaming chip by capturing the gaming chip 110 placed on the placement table 10 by the capturing device 50. Therefore, as in the inspection system 101 of the first embodiment, it is not necessary to place the gaming chip 110 according to the predetermined rules or the denomination pre-assigned to the placement table 10, and the gaming chip 110 of any denomination can be placed in multiple chip placement areas.

In this embodiment, the control device 30 may make a determination using the identification information written on the surface of the gaming chip 110. For example, the control device 30 may read the identification information on the surface of the gaming chip 110 from the captured image and make an inquiry to the chip management system 200. In this case, the RFID reading system may be omitted.

Alternatively, the identification information recognized from the captured image and the identification information recognized by the RFID reading system may be compared to inspect the gaming chip. If the two are different, the control device 30 determines that either the appearance of the gaming chip 110 has been tampered with or that an unregistered RFID tag 111 has been used.

The control device 30 determines that the gaming chip is normal if there are no problems of any kind prepared in the inspection system 102.

In this embodiment, the gaming chip 110 stores identification information in the RFID tag 111 and also has additional identification information by means other than the RFID tag, i.e., by printing with ink. In addition, the chip management system 200 stores the reading history of the RFID reading system of each inspection system 102. In other words, the chip management system 200 stores which identification information was read at which inspection system 102 and when.

When the control device 30 determines that the RFID tag of the gaming chip is broken or does not have a built-in RFID tag, it can acquire the history of the reading of the gaming chip stored in the chip management system 200 using identification information possessed by means other than the RFID tag. This makes it possible to track the extent to which the RFID tag 111 has been read correctly, which can lead to the detection of fraud.

If the RFID tag is faulty or there is no RFID tag, the identification information to be deactivated is not known, so identification information held by means other than the RFID tag can be found and the identification information can be deactivated. For gaming chips that do not have an RFID tag 111, it is possible that the removed RFID tag 111 is used to counterfeit another type of gaming chip, so the identification information identified by means other than the RFID tag is deactivated.

Figure 16:
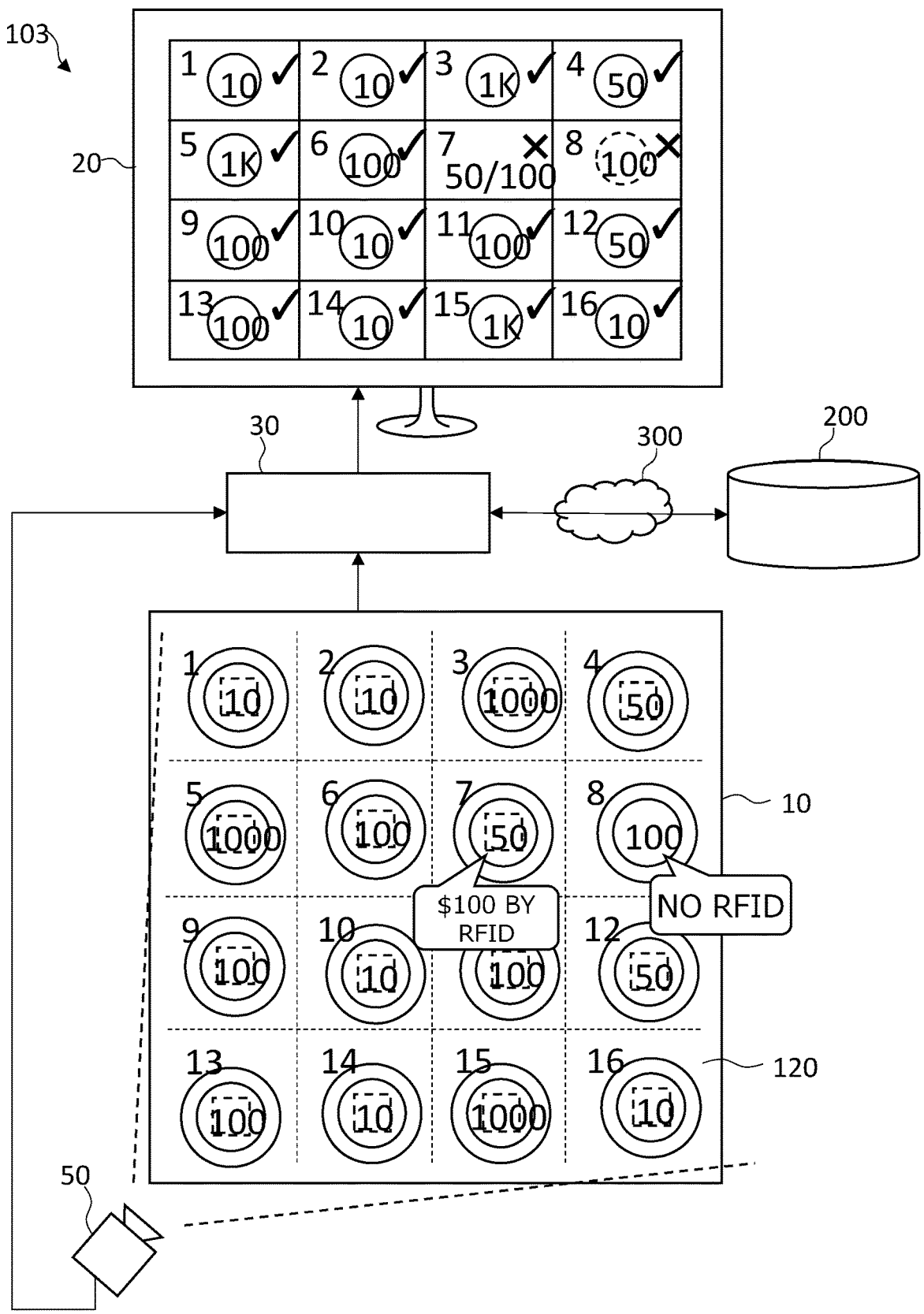
FIG. 16 shows a configuration of an inspection system of the third embodiment of the present disclosure.

FIG. 16 shows a configuration of an inspection system of the third embodiment of the present disclosure. The inspection system 101 of the first embodiment described above consists of a placement table 10, a display device 20, a control device 30, and a storage device 40 were integrated into a stand-alone type system that can be used without being connected to a communication network.

The inspection system 102 of the second embodiment was a network type system in which the chip management system 200, which corresponds to the storage device 40, is connected to multiple inspection systems 102 via a communication network. The inspection system 103 of the present embodiment is a networked system in which a placement table 10, a display device 20, a control device 30, and a chip management system 200 corresponding to a storage device 40 are respectively configured as a separate device.

In addition, in the example of FIG. 16, the gaming chip 110 in area number 7 has an appearance of a $50 chip but the denomination based on the reading of the RFID tag 111 by the RFID reading system is $100. In this case, the display device 20 shows that $50 and $100 are recognized for area number 7.

In addition, for area number 8, the gaming chip 110 does not have an RFID tag 111, and the denomination cannot be identified based on the RFID tag 111, but the capturing device 50 recognizes that it is $100 based on its appearance. Therefore, the display device 20 then displays the fact that the RFID tag 111 could not be read and that the appearance of the tag is $100. In other words, in this embodiment, the contents recognized through the capturing device and the RFID reading system are displayed as they are.

In this embodiment, a personal computer can be used as the control device 30, and a PC monitor can be used as the display device 20.

Figure 17:
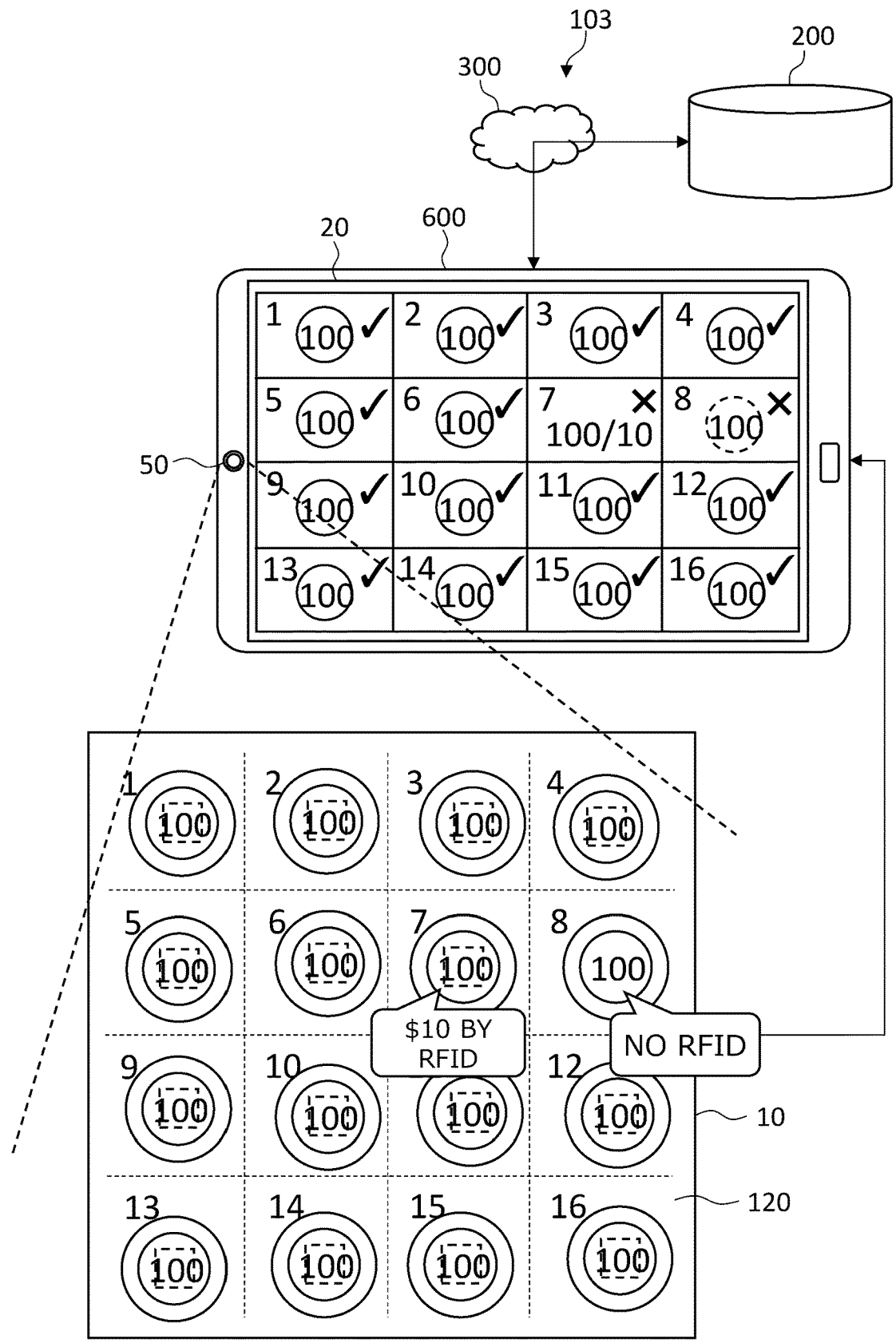
FIG. 17 shows a variation of the inspection system of the third embodiment of the present disclosure.

FIG. 17 shows a variation of the inspection system of the third embodiment of the present disclosure. In this variation, the inspection system 103 consists of a placement table 10 with a built-in RFID reading system, a tablet computer 600, and a chip management system 200. In other words, compared to the third embodiment described above, the display device 20, the control device 30, and the capturing device 50 are realized by a single device, the tablet computer.

The tablet computer 600 and (the RFID reading system of) the placement table 10 communicate with each other by wired or short-range wireless. In addition, the tablet computer 600 is connected to the communication network 300 by a wireless router to communicate with the chip management system 200.

In this example, all functions of the control device 30, such as image recognition, determination, and display, may be provided to the tablet computer 60 as a single packaged application.

Figure 18:
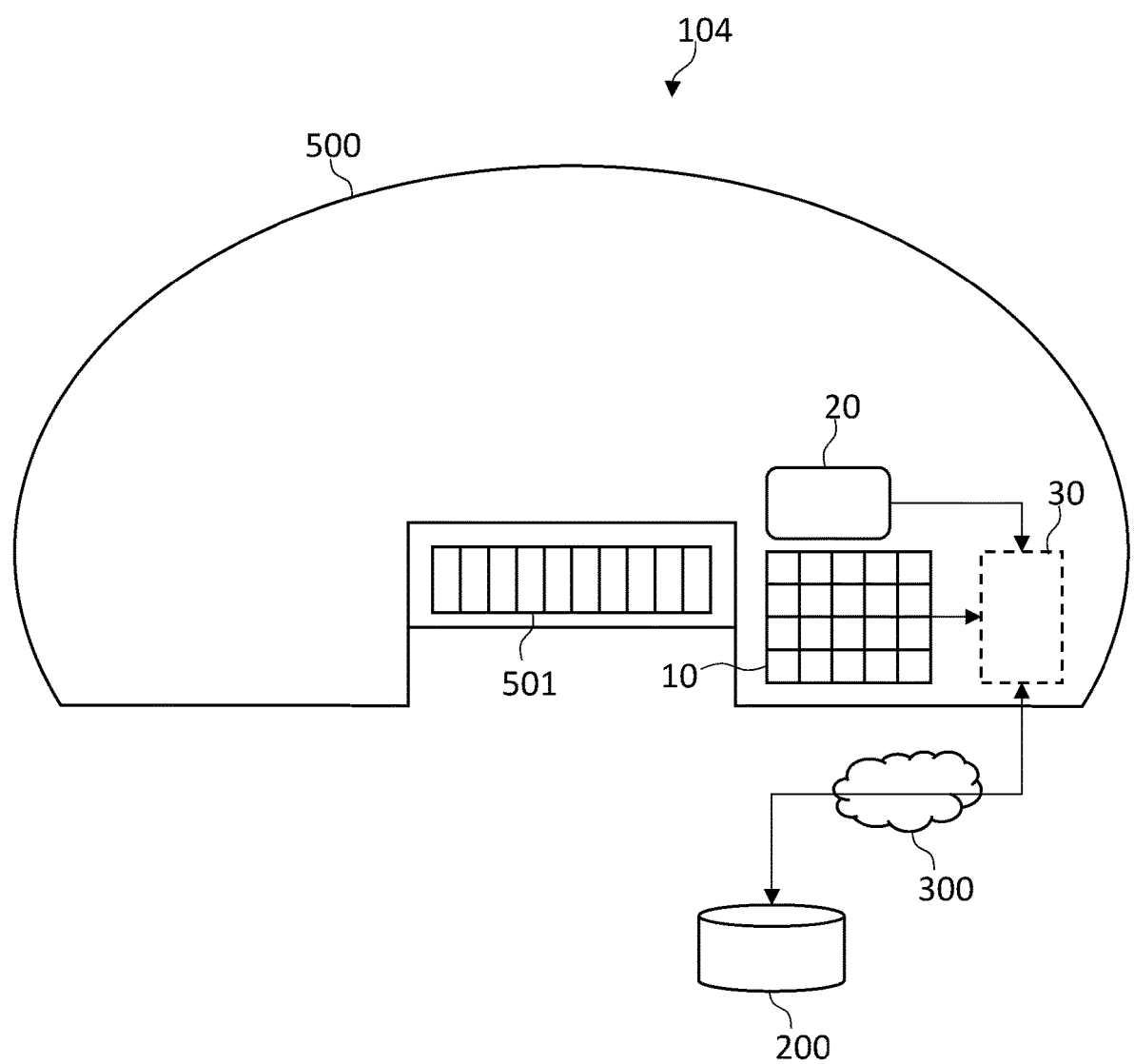
FIG. 18 shows a configuration of an inspection system of the fourth embodiment of the present disclosure.

FIG. 18 shows a configuration of an inspection system of the fourth embodiment of the present disclosure. In the inspection system 104 of this embodiment, the placing surface 120 is installed close to the dealer position on the table surface of the game table 500. The placing surface 120 has a chip placement area of four rows and five columns divided by lines. In the vicinity of the placing surface 120, a display device 20 is embedded in the table surface, and a control device 30 is provided inside the game table 500.

Each control device 30 of the plurality of game tables 500 is communicatively connected to the chip management system 200 via a communication network 300. The RFID reading system reads the RFID tags 111 of the gaming chips 110 placed in each chip placement area of the placing surface 120. A camera may be installed on the ceiling to recognize the gaming chips with the camera.

The control device 30 uses the identification information that the RFID reading system reads from the RFID tag 111 as a key to query the chip management system 200 to obtain information on the denomination associated with that identification information. After that, the control device 30 may check whether the identified denomination is the same for each row and follows the rule that the denomination is smaller for the upper row, in the same way as in the first embodiment.

Alternatively, the control device 30 may determine whether or not the gaming chip 110 in each chip placement area is normal by determining whether or not the denomination information read from the RFID tag 111 of the gaming chip 110 by the RFID reading system matches the denomination obtained from the chip management system 200.

In this embodiment, the lines demarcating each chip placement area on the placing surface may be emitted from below the table surface when necessary by LED lights to indicate the chip placement areas.

In this system, the chip tray 501 is a tray that houses the chips of the dealer, and an RFID reading system may be provided therewith. The RFID reading system of the chip tray 501 may be linked to the RFID reading system of the inspection system 104.

Figure 19:
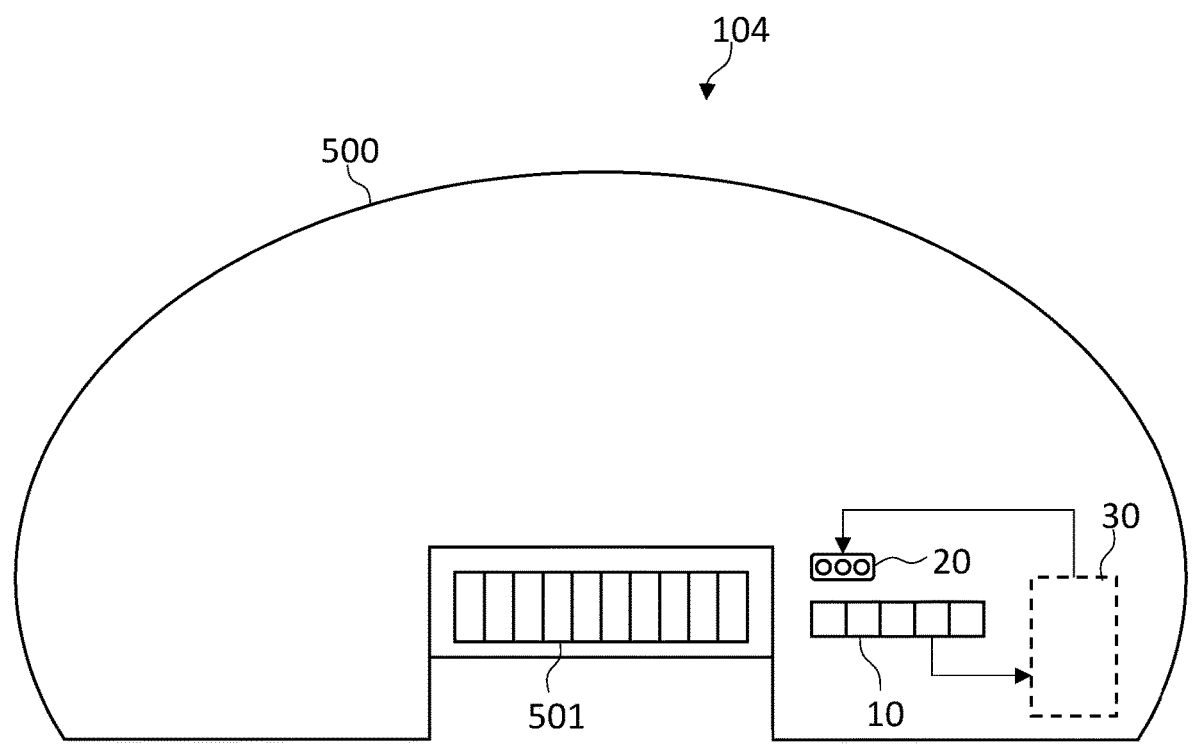
FIG. 19 shows a variation of the inspection system of the fourth embodiment of the present disclosure.

FIG. 19 shows a variation of the inspection system of the fourth embodiment of the present disclosure. In this example, five chip placement areas in one row are provided on the table surface of the game table 500. The dealer shall place the same denomination of gaming chip 110 in the row. These chip placement areas may be equipped with a monitor or lamp.

The RFID reading system reads the denomination information stored in the RFID tag 111 of the gaming chip 110 placed one by one in multiple chip placement areas. The control device 30 obtains the reading results from the RFID reading system. If there is even one different denomination among the multiple denomination information obtained from the RFID reading system, that is, if the denomination information of all the gaming chips 110 is not the same, the control device 30 determines that there is a counterfeit gaming chip 110 among the multiple gaming chips 110.

In addition, if the number of RFID tags 111 corresponding to the number of chip placement areas (five in this example) has not been read, the control device 30 determines that there is a gaming chip 110 in which the RFID tag 111 has failed or there is a gaming chip 110 that does not have the RFID tag 111.

In the inspection system 104 of this example, three lamps are provided as a display device 20. Each of the lamps is controlled to turn on and off by the control device 30. The control device 30 turns on the green normal lamp when the five gaming chips 110 are normal, turns on the orange counterfeit lamp when it is determined that there is a counterfeit gaming chip 110, and turns on the red fault lamp when it is determined that there is a gaming chip 110 which RFID tag has failed or that does not have the RFID tag 111.

According to this example, the area of the inspection system 104 occupying the table surface of the game table 500 can be kept small to reduce the impact on other operations by the dealer.

Figure 20:
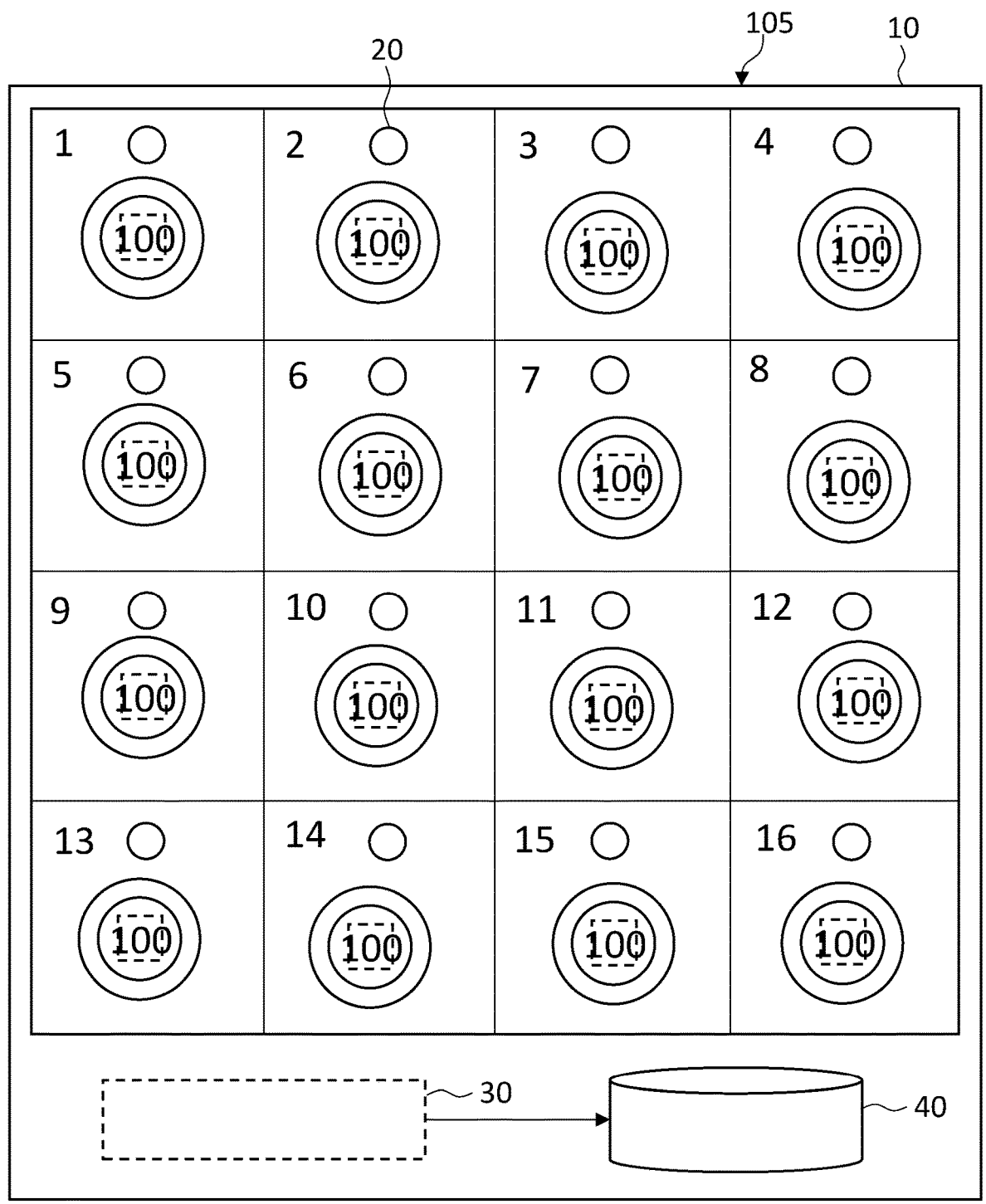
FIG. 20 shows a configuration of an inspection system of the fifth embodiment of the present disclosure.

FIG. 20 shows a configuration of an inspection system of the fifth embodiment of the present disclosure. As shown in FIG. 20, in the inspection system 105 of this embodiment, a display device 20 is provided in each chip placement area of the placement table 10 to show the determination result. In this embodiment, the display device 20 provided in each chip placement area is a lamp that indicates the content of the determination by its color, but in addition to or instead of this, a liquid crystal display panel may be provided in each chip placement area.

The inspection system 105 inspects the gaming chips 110 in the same way as the inspection system 101 and expresses the determination result of the gaming chips in each chip placement area by the color of the lamp in the corresponding chip placement area.

Figure 21:
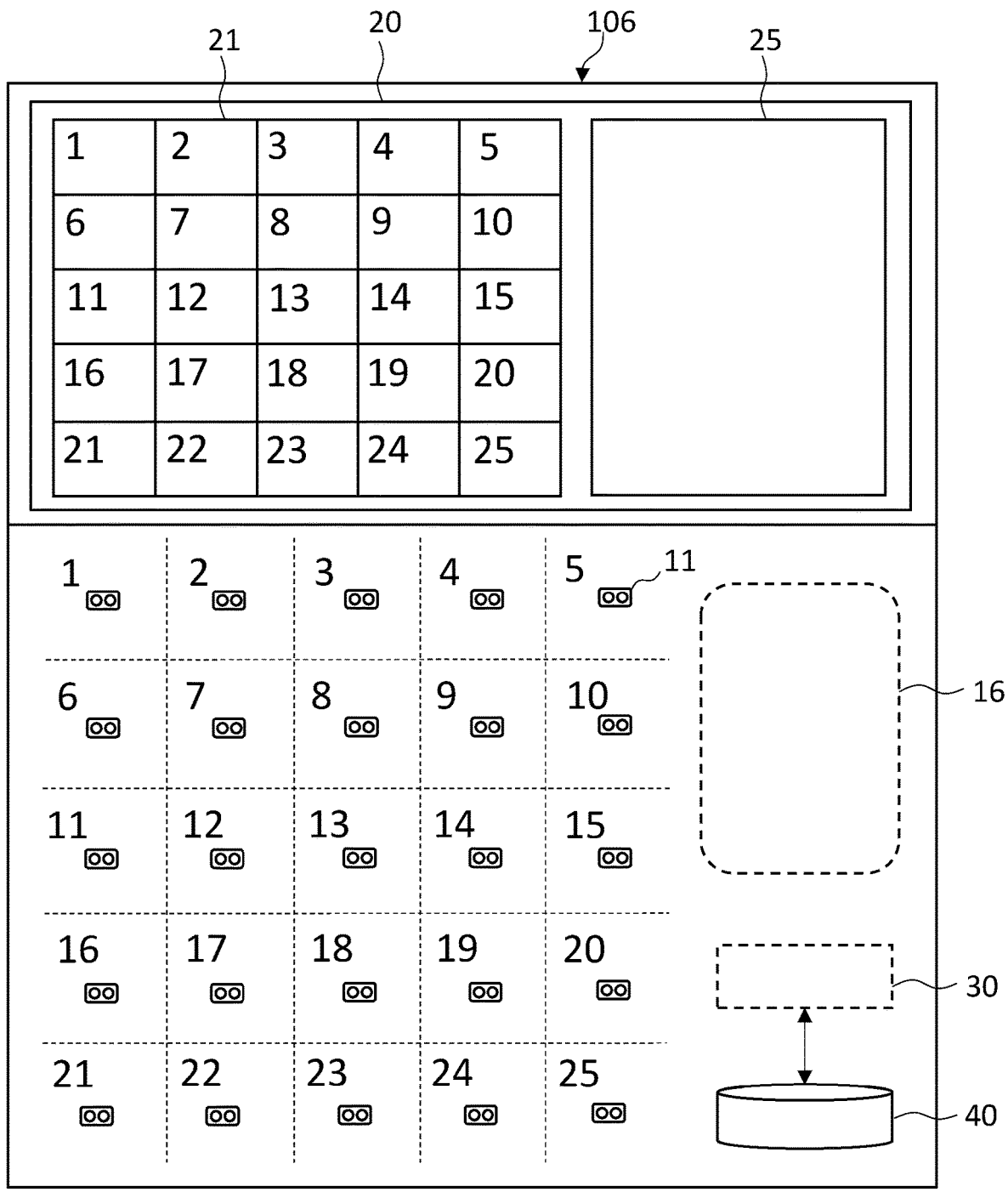
FIG. 21 shows a configuration of an inspection system of the sixth embodiment of the present disclosure.

FIG. 21 shows a configuration of an inspection system of the sixth embodiment of the present disclosure. As shown in FIG. 21, the inspection system 106 of this embodiment has a multiple chip placement area 16 on the placement table 10, compared with the first embodiment.

In this multiple chip placement area 16, a reading antenna (omitted in the figure) is provided to read the RFID tags 111 of the plurality of gaming chips 11 placed in the multiple chip placement area 16. As in the first embodiment, a jamming antenna may be provided in correspondence with the reading antenna, or a shield may be provided to prevent the reading antenna from reading the RFID tag 111 of the gaming chip 110 in the adjacent multiple chip placement area.

When using the inspection system 106 of this embodiment, the dealer or other casino staff first stacks on the multiple chip placement area 16 multiple (e.g., five for one line) pieces of gaming chip 110 to be placed in the chip placement area before placing the gaming chips 110 one by one in the chip placement area.

The reading antenna of the multiple chip placement area 16 can collectively read the RFID tags 111 of the plurality of gaming chips 110 placed in the multiple chip placement area 16 and displays the results on the multiple reading result display section 25.

Figure 22:
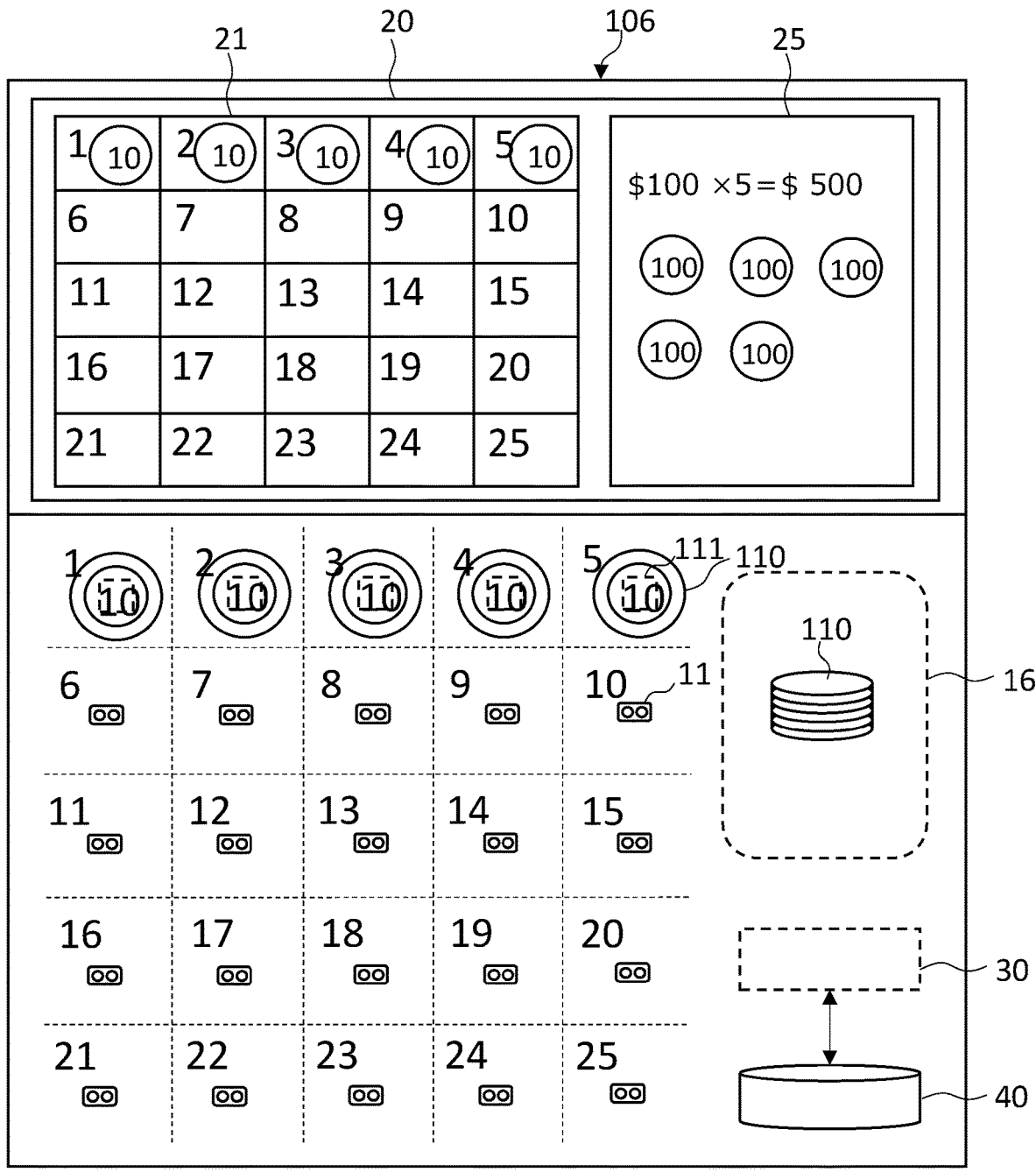
FIG. 22 shows an example of the use of the inspection system of the sixth embodiment of the present disclosure.

FIG. 22 shows an example of the use of the inspection system of the sixth embodiment of the present disclosure. In this example, five $100 chips are placed in the multiple chip placement area 16. The multiple reading result display section 25 shows the result of the reading of the RFID reading system of the multiple chip placement area 16.

The dealer and other casino staff (hereinafter simply referred to as "dealer") will thus take out five pieces of the gaming chip 110 and place them in the multiple chip placement area 16. At this time, the dealer visually checks the denominations of the five gaming chips 110. Typically, five pieces of gaming chip 110 of the same denomination are placed in the multiple chip placement area 16.

The contents read by the RFID reading system in the multiple chip placement area 16 are displayed on the multiple reading result display 25, and the dealer confirms this. If the result is different from what is visually confirmed, the dealer places the five gaming chips 110 one by one in the chip placement area for further inspection.

Since it is time-consuming to place the gaming chips one by one in the chip placement area, the multiple gaming chips are placed together in the multiple chip placement area 16, and if the dealer confirms that all the gaming chips are normal by checking the multiple read result display section 25 that displays the information, the inspection may be terminated there. In this way, the time required for inspection can be shortened. If a plurality of gaming chips are placed on the multiple chip placement area 16 and an abnormal gaming chip is identified, the dealer can place the gaming chips one by one in the respective chip placement area to identify the abnormal gaming chip.

In this embodiment, even the denominations of the gaming chips 110 placed in the multiple chip placement area 16 are identified, but alternatively, only the number of gaming chips may be identified in the multiple chip placement area 16. In this case, the dealer visually confirms the predetermined number of pieces in the plurality of chip placement area 16, and the multiple reading result display section 25 shows the number of RFID tags 111 that have been read as a reading result.

With this configuration, first of all, it is possible to check whether there is a gaming chip 110 in which the RFID tag 111 is faulty or which does not have an RFID tag 111. If there is a gaming chip 110 in which the RFID tag 111 is faulty or which does not have an RFID tag 111, the number of gaming chips 110 placed in the multiple chip placement area 16 and the number of gaming chips displayed in the multiple read result display section 25 will be different.

However, at this stage, it is unclear which of the plurality of the gaming chips 110 has the problem. Therefore, these multiple gaming chips 110 are placed one by one in the adjacent chip placement areas and are inspected one by one.

The multiple chip placement area 16 may be designed to be wide enough to place, for example, five chip cases containing 20 gaming chips. In this case, five chip cases containing 20 gaming chips (100 gaming chips in total) can be placed in the multiple chip placement area 16, and the result is displayed in the multiple reading result display section 25. The person executing the inspection places a plurality of chip cases containing 20 gaming chips in the multiple chip placement area 16, and if the reading result matches the gaming chips visually confirmed (e.g., one hundred $100 gaming chips of 5 cases of 20 chips), the inspection can be terminated there, and if they do not match, those chip cases can be placed one by one in the multiple chip placement area 16 for inspection. If a chip case with the problem is identified, the chip case is opened, the gaming chips 110 are removed therefrom and placed on the chip placement area of the placement table 10 one by one for inspection.

Alternatively, the control device 30 may check whether or not there are a predetermined number (e.g., 100) of gaming chips 110 of the same denomination in the multiple chip placement area 16, and display only the result of the pass/fail determination on the multiple reading result display section 25. The control device 30 may only determine whether the denominations of the plurality of gaming chips 110 read in the multiple chip placement areas 16 are all the same, and the result of the pass/fail determination may be displayed on the multiple reading results display section 25. The multiple chip placement area 16 and the multiple reading result display section 25 may be configured separately from the placement table 10.

Figure 23:
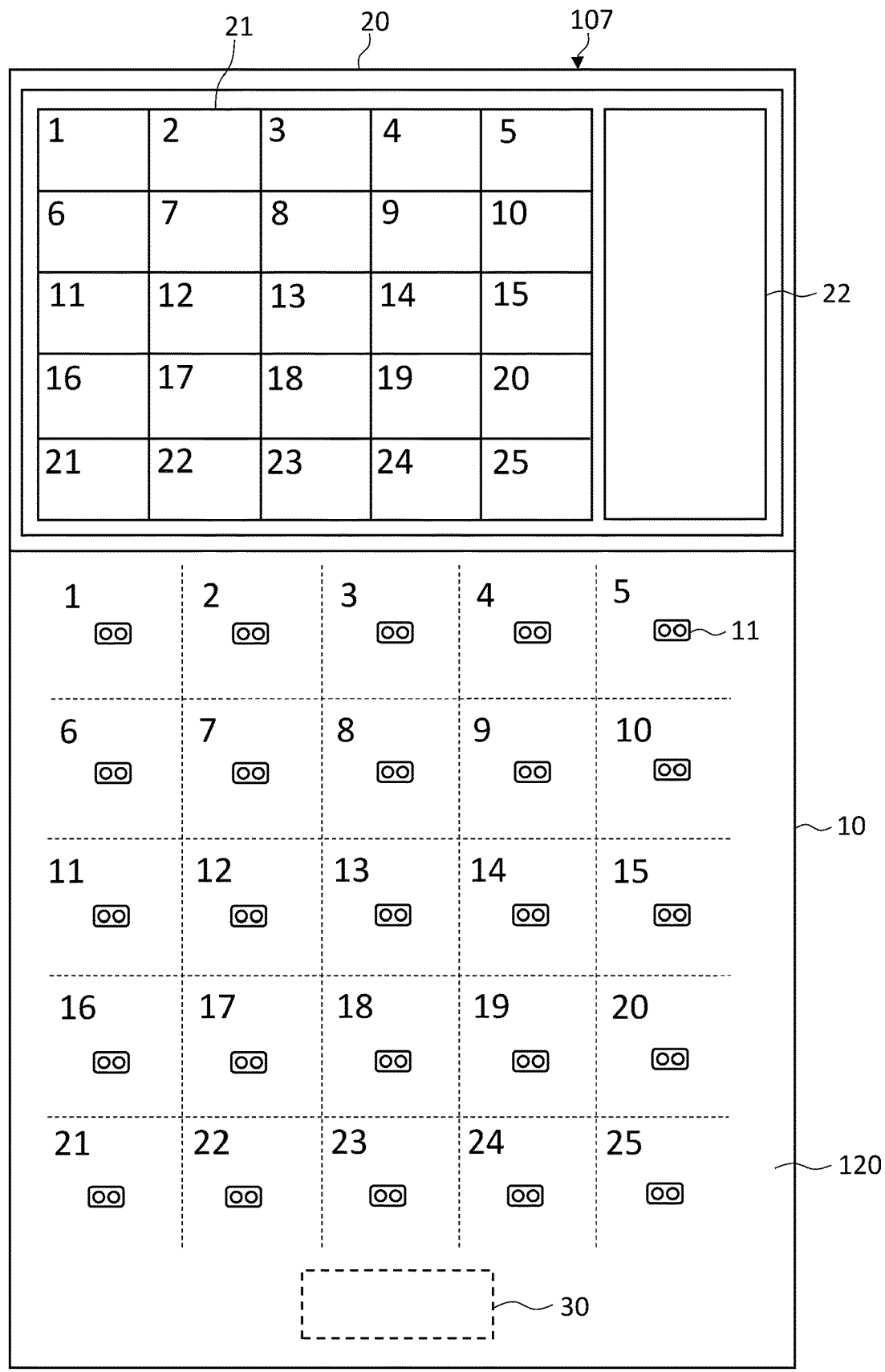
FIG. 23 shows a configuration of an inspection system of the seventh embodiment of the present disclosure.

FIG. 23 shows a configuration of an inspection system of the seventh embodiment of the present disclosure. Compared with the inspection system of the first embodiment, the inspection system 107 of this embodiment is not equipped with a storage device 40, and can be used without communicating with the chip management system 200 as in the second embodiment. Also, the control device 30 does not perform the above inspection and determination.

The RFID reading system of the placement table 10 reads the denomination information from the gaming chip 110 placed in each chip placement area. The control device 30 displays the denomination information read by the RFID reading system in the per-area display area 21. In addition, the control device 30 aggregates the information on the denominations of gaming chips read from the RFID tags 111 of the gaming chips in chip placement areas by the RFID reading system and displays the aggregate result in the aggregate display area 22.

Figure 24:
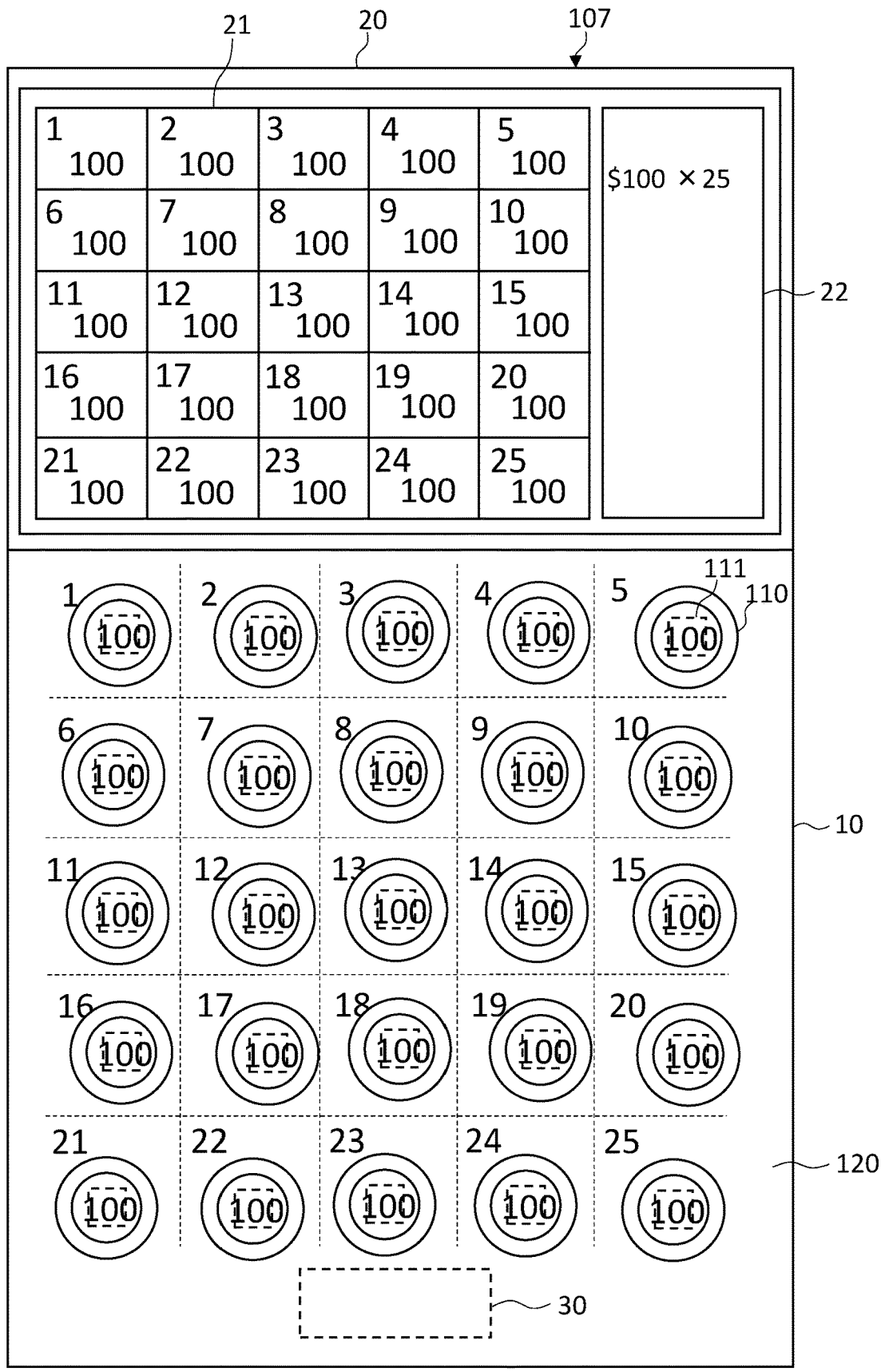
FIG. 24 shows an example of the use of the inspection system of the seventh embodiment of the present disclosure.
Figure 25:
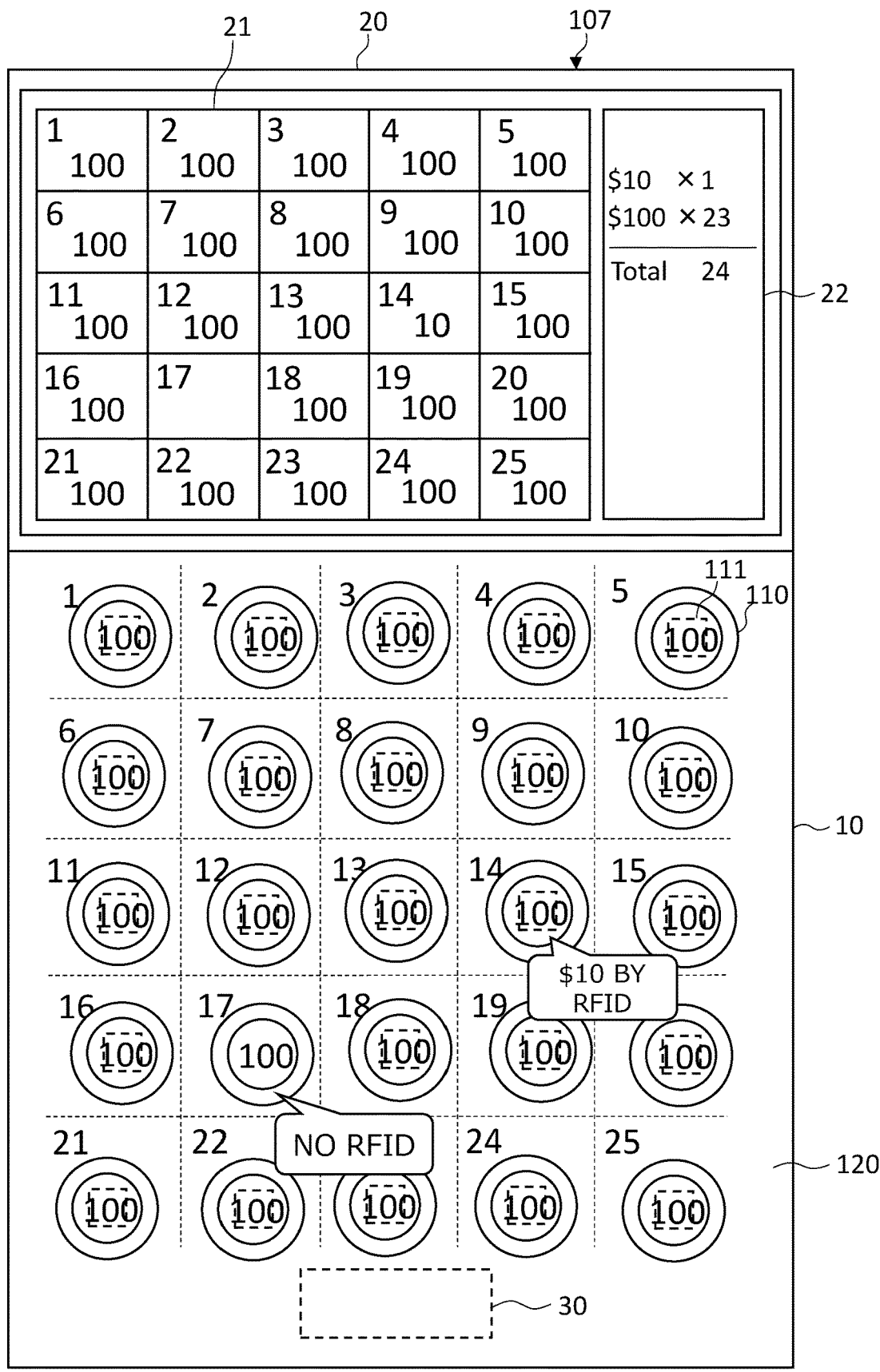
FIG. 25 shows another example of the use of the inspection system of the seventh embodiment of the present disclosure.

FIG. 24 shows an example of the use of the inspection system of the seventh embodiment of the present disclosure. In this example, a dealer places $100 chips in all chip placement areas while visually checking them. The per-area display area 21 shows that $100 chips have been read for all area numbers, and the aggregate display area 22 shows that twenty-five $100 chips have been read. The dealer compares the appearance of the gaming chips 110 placed on the placement table 10 with the displays in the per-area display area 21 and the aggregate display area 22 to confirm that there is no problem with all of these twenty-five gaming chips FIG. 25 shows another example of the use of the inspection system of the seventh embodiment of the present disclosure. In this example, the gaming chip 110 placed in area number 14 has the denomination information of $10 stored in the RFID tag 111, but the appearance is that of a $100 chip. The dealer recognizes that the gaming chip 110 is a $100 chip and places it with other $100 chips in area number 14. In the per-area display area 21, only area number 14 shows $10, while it should show the same $100 for all area numbers. The dealer confirms the gaming chip 110 placed on the placement table 10 and this display in the per-area display area 21, thereby determines that the gaming chip 110 in area number 14 is counterfeit.

In addition, the gaming chip 110 placed in area number 17 does not have a built-in RFID tag 111. Therefore, in the per-area display area 21, the number representing the denomination is not displayed for area number 17. The dealer can determine that the gaming chip 110 in area number 17 has failed by checking the gaming chip 110 placed on the placement table 10 and this display in the per-area display area 21.

In addition, in the aggregate display area 22, since there are a counterfeit gaming chip 110 in area number 14 and a malfunctioning gaming chips 110 in area number 17, therefore there are only twenty-three $100 chips, and there is one $10 chip instead, it is displayed that there are twenty-four chips in total, while it should be displayer that there are twenty-five $100 chips. The dealer can determine that there is one counterfeit gaming chip 110 and one faulty gaming chip 110 by confirming such a display in the aggregate display area 22.

As described above, in this embodiment of inspection system 107, the control device 30 does not perform inspection or determination, but the display device 20 displays information for the dealer to make a judgment. In particular, if the operation is to place gaming chips of the same denomination in the chip placement areas, etc., counterfeit or malfunctioning gaming chip can be easily detected by checking the display device 20. For example, if the per-area display area 21 is colored differently for each type (denomination) of gaming chip 110 recognized, the existence of gaming chip 110 of a different denomination from the appearance becomes obvious.

Figure 26A:
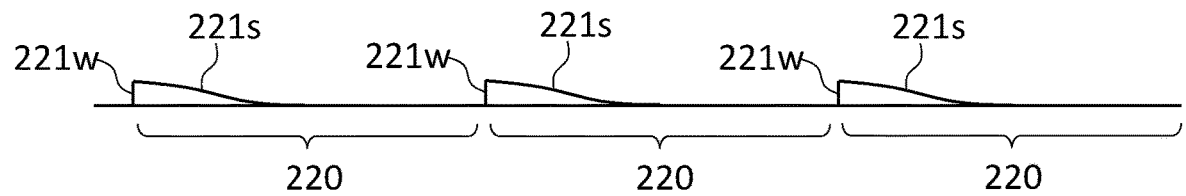
FIG. 26A shows a cross-sectional view of a portion of the placement table of the inspection system of the eighth embodiment of the present disclosure.
Figure 26B:
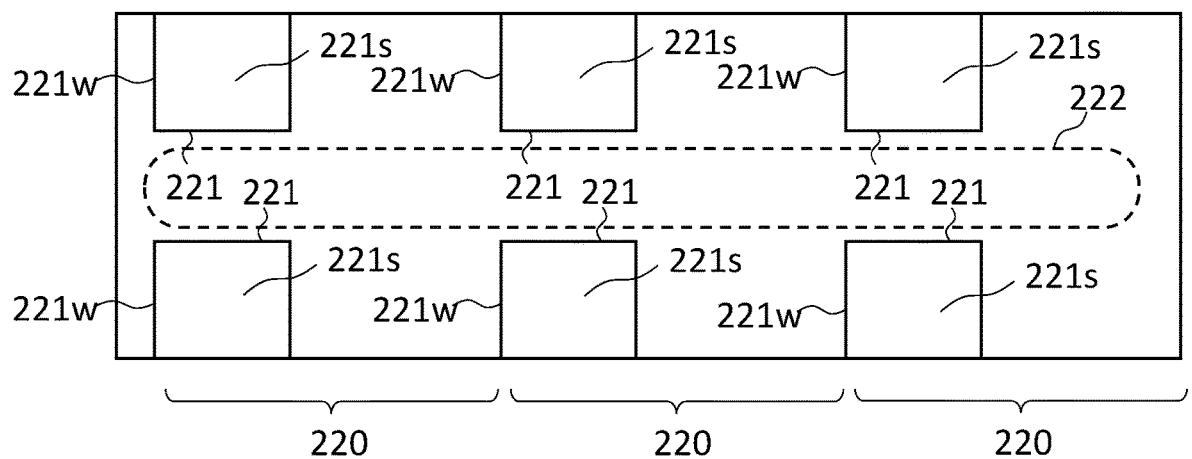
FIG. 26B shows a plan view of a part of the placement table of the inspection system of the eighth embodiment of the present disclosure.

FIG. 26A shows a cross-sectional view of a portion of the placement table of the inspection system of the eighth embodiment of the present disclosure, and FIG. 26B shows a plan view of a part of the placement table of the inspection system of the eighth embodiment of the present disclosure. The placement table 10 of this embodiment includes a stopper 221 for placing one gaming chip 110 in each chip placement area 220. The stoppers 221 are provided at the left end of each chip placement area 220, divided into upper and lower parts. Each stopper 221 has a wall 221w that rises vertically from the placing surface 220 at the left end of the chip placement area 220 and a slope 221s sloping gently from the wall 221W to the center of chip placement area 220. The height of the wall 221w is about the same as or slightly lower than the thickness of the gaming chip 110. A groove is formed between adjacent stoppers 221 in the vertical direction in which no stopper 221 is provided.

Figure 27A:
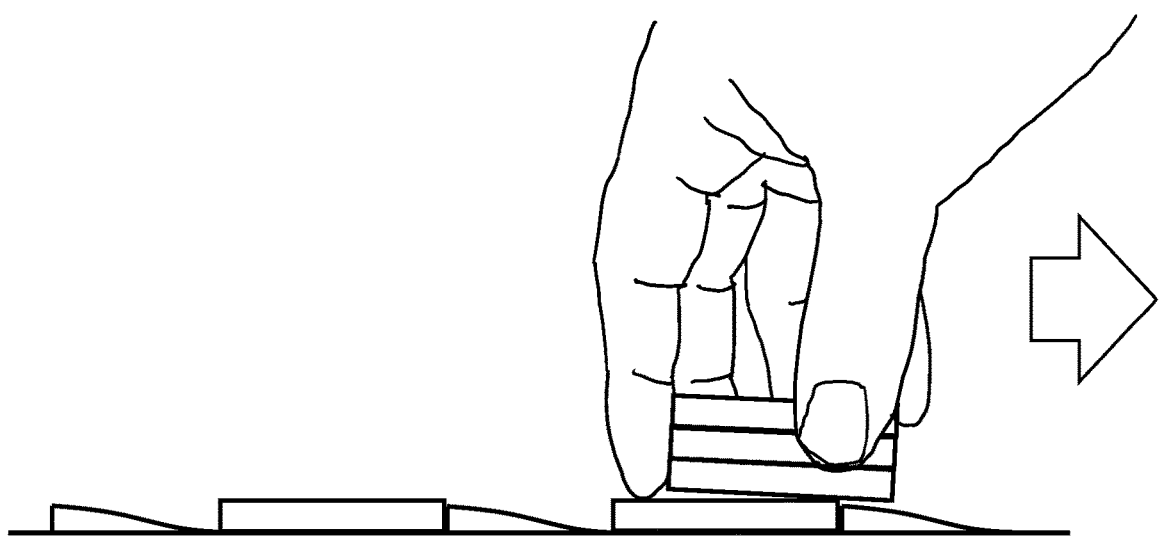
FIG. 27A shows an example of the use of the inspection system of the eighth embodiment of the present disclosure.
Figure 27B:
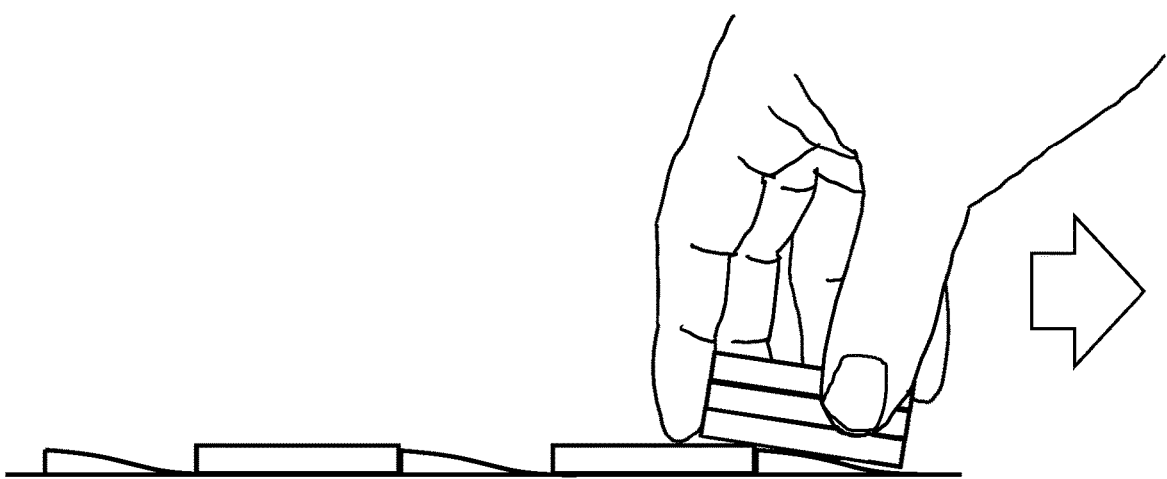
FIG. 27B shows an example of the use of the inspection system of the eighth embodiment of the present disclosure.

FIGS. 27A and 27B show an example of the use of the inspection system of the eighth embodiment of the present disclosure. A person who conducts an inspection, when placing one gaming chip 110 on each chip placement area 220 of the placement table 10, can pick up a stack of five gaming chips 110 of the same denomination with his/her fingers and place them in the row where the gaming chip 110 is to be placed, move his/her hand from left to right to place one gaming chip 110 in each chip placement area 220 one by one. As shown in FIG. 27A, the bottom gaming chip 110 of the plurality of gaming chips 110 held by him/her is in contact with the wall 221w of the stopper and does not move the right any more, then as shown in FIG. 27B, only the second from the bottom and the one above it can be moved to the right by hand. In this way, the gaming chips can be smoothly placed row by row on each chip placement area 22 of the placement table 10.

By using such a stopper 221, the gaming chips 110 placed in each chip placement area 220 can also be removed from the placement table 10. When removing the gaming chips 110, the person who conducts the inspection should place one finger along the groove 222, moves his hand from right to left, while keeping one finger along the groove 222. The right end portion of the gaming chip 110 is pushed by the finger and moves up the slope 221s from the left end. The left end of the gaming chip being pushed in the left direction climbs up the slope 221s and falls on top of the next gaming chip 110, and together with the other gaming chips, the next gaming chip 100 is pushed by the finger and moves to the left. By repeating this process, the person only needs to move his/her hand to the left with his/her finger along the groove 222 to collect, in a stacked manner from the bottom, the plurality of gaming chips 110 arranged in a single row.

The first through eighth embodiments have been described above, but the components of each embodiment can be combined as desired.

In the inspection system, it is basically assumed that most of the gaming chips are normal. Therefore, the system may use sound to notify the user when it detects a non-normal gaming chip. By using sound and/or a lamp to output the inspection results, the inspection results can be known by sound even when, for example, the lamp is broken. Also, sound is easier to check than visual confirmation. Conversely, a sound can be used to notify the user when a normal gaming chip has been read.

In addition, when a gaming chip is not normal due to tampering with its appearance, etc., it is possible to track the state before the appearance was tampered with, etc., by obtaining the reading history of the RFID tag 111 and thereby discover where the fraud occurred.

If a gaming chip has a malfunctioning RFID tag 111 or a gaming chip does not have an RFID tag 111, such a gaming chip may be dismantled and checked.

In the above embodiment, the radio waves or magnetic fields of the RFID antenna are strong enough to read only one piece of gaming chip, so that no radio waves or magnetic fields are formed far away.

In addition, counterfeit gaming chip will not be exchanged for cash, and if a gaming chip with a malfunctioning RFID tag 111, a gaming chip that does not have an RFID tag 111, or a gaming chip that is not normal is found, a person of higher rank (such as a manager) is called first. If the RFID tag 111 is faulty or untagged, the RFID can be identified based on the other ID and the identified RFID can be deactivated or blacklisted.

The invention claimed is:

1. An inspection system configured to inspect gaming chips having built-in RFID tags readable by an RFID reading system, each of the gaming chips having an appearance expressing at least a denomination, the inspection system comprising:
   a placing surface having a plurality of areas for placing a plurality of gaming chips to be inspected one by one, each of the plurality of areas having a size corresponding to a gaming chip;
   the RFID reading system configured to read the RFID tags of the gaming chips placed in each of the plurality of areas on the surface to obtain a reading result for each area of the plurality of areas;
   a chip recognition system configured to recognize, for each area, a presence or absence of a gaming chip placed in the area, the chip recognition system including a plurality of object detection sensors, each area having a respective object detection sensor of the plurality of object detection sensors;
   a control device configured to determine, for each area, an inspection result based on the respective reading result and the respective recognition result for the area;
   the control device configured to determine if there is a fraudulent gaming chip among the gaming chips placed in the plurality of the areas of the placing surface based on the respective reading result and the respective recognition result for the area; and
   a display device configured to reflect, for each area, the inspection result determined by the control device for the area,
   wherein the inspection result determined by the control device includes at least one of:
   (1) the gaming chip placed in the area is a normal state;
   (2) the gaming chip placed in the area has a broken RFID tag or does not have a built-in RFID tag; and
   (3) there is no gaming chip placed in the area,
   wherein the control device is configured to determine that, when the gaming chip has been recognized by the chip recognition system but the RFID tag could not be read successfully by the RFID reading system, the inspection result is (2), and wherein the control device is configured to determine that, when the gaming chip is not recognized in the area by the chip recognition system, the inspection result is (3).

2. The inspection system according to claim 1, wherein:
   a plurality of placement areas formed by the plurality of areas in a column direction are provided in a row direction, and
   the control device is configured to determine that the gaming chip whose identification information read by the RFID reading system is different from a type information of the gaming chips on both sides of the column direction is not in the normal state.

3. The inspection system according to claim 1, wherein:
   a plurality of placement areas formed by the plurality of areas in a column direction are provided in a row direction, and
   the control device is configured to determine that the gaming chip whose identification information read by the RFID reading system does not have a predetermined relationship with a type information of the gaming chips on both sides of the column direction is not in the normal state.

4. The inspection system according to claim 1, wherein the control device is configured to determine that the gaming chip in an area where the RFID tag reading is unstable is in a state that reading of the RFID tag is unstable.

5. The inspection system according to claim 4, wherein:
the RFID reading system is capable of changing strength of radio waves or magnetic fields for reading the RFID tag for each area, and
the control device is configured to determine that the gaming chip in the area where the gaming chip can be read when the strength of radio waves or magnetic fields is strong and cannot be read when the strength of radio wave or magnetic fields is weak is in the state that reading of the RFID tag is unstable.

6. The inspection system according to claim 1, wherein:
the chip recognition system is further configured to recognize, using optical means, at least a type of the gaming chip placed on each of the plurality of areas of the placing surface, and
the control device is configured to determine that the gaming chip is not in the normal state if the type information read by the RFID reading system does not correspond to the type determined by the chip recognition system.

7. The inspection system according to claim 6, wherein the chip recognition system comprises:
a camera is configured to capture the gaming chip placed on the placing surface and generates a captured image; and
a recognition device is configured to recognize the type of the gaming chip in each area by analyzing the captured image.

8. The inspection system according to claim 6, further comprising:
a storage device is configured to store at least the type information of a plurality of the gaming chips in association with identification information,
wherein the control device is configured to determine that the gaming chip for which the type recognized by the chip recognition system does not correspond to the type information associated in the storage device with the identification information read by the RFID reading system is not in the normal state.

9. The inspection system according to claim 6, wherein the control device is configured to determine that the gaming chip for which the type recognized by the chip recognition system does not correspond to the type information read by the RFID reading system is not in the normal state.

10. The inspection system according to claim 1, wherein the display device consists of a plurality of lamps corresponding to each of the plurality of areas, which indicates the status by a color.

11. The inspection system according to claim 10, wherein the lamps are provided in each of the plurality of areas of the placing surface.

12. The inspection system according to claim 10, wherein the display device is configured to show, for each area, the type information read by the RFID reading system.

13. The inspection system according to claim 1, wherein the display device is a display panel consisting of a plurality of pixels arranged in a two-dimensional array.

14. The inspection system according to claim 13, wherein the display panel is configured to show at least an area indicating contents of counterfeit and/or contents of fault.

15. The inspection system according to claim 13, wherein the display panel is configured to show at least the number of normal gaming chips.

16. The inspection system according to claim 1, wherein each RFID tag stores a type information representing a type of a respective gaming chip having the RFID tag, and
wherein the reading results represent type information read from the RFID tags of gaming chips placed in the plurality of areas.

17. The inspection system according to claim 16, wherein, in the plurality of areas, the types of gaming chips to be placed are defined, and
wherein the control device is further configured to determine that the gaming chip placed in an area is the fraudulent gaming chip when the respective type information of the respective RFID tag of the gaming chip read by the RFID reading system does not correspond to the type defined for the area.

18. The inspection system according to claim 1, wherein each RFID tag stores an identification information of a respective gaming chip having the RFID tag, and
wherein the reading results represent identification information obtained from RFID tags of gaming chips placed in the plurality of areas.

19. The inspection system according to claim 18, wherein each RFID tag further stores a type information representing a type of the respective gaming chip having the RFID tag, and
wherein the reading results further represent type information obtained from RFID tags of gaming chips placed in the plurality of areas.

20. The inspection system according to claim 19, wherein a plurality of placement areas formed by the plurality of areas in a row direction are provided in a column direction, and
wherein the control device is further configured to determine that the gaming chip is the fraudulent gaming chip if the identification information of the gaming chip read by the RFID reading system is different from type information of gaming chips placed in areas on both sides of the gaming chip in the row direction.

21. The inspection system according to claim 19, wherein a plurality of placement areas formed by the plurality of areas in a column direction are provided in a row direction, and
wherein the control device is further configured to determine that the gaming chip is the fraudulent gaming chip if the identification information of the gaming chip read by the RFID reading system does not have a predetermined relationship with type information of gaming chips placed in areas on both sides of the gaming chip in row direction.

22. The inspection system according to claim 18, further comprising a database configured to store identification information of a plurality of the gaming chips,
wherein the control device is further configured to determine that the gaming chip is the fraudulent gaming chip if the identification information of the gaming chip read by the RFID reading system is not stored in the database.

23. The inspection system according to claim 18, further comprising a database configured to store identification information of a plurality of the gaming chips and activation information of the plurality of the gaming chips, wherein the identification information and the activation information are associated with each other,
wherein the control device is configured to:

based on an identification information of a gaming chip read by the RFID reading system, refer an activation information of the gaming chip from the database, and determine that, when the activation information of the gaming chip does not indicate an active state, the gaming chip is not in the active state.

24. The inspection system according to claim 18, further comprising:
a database configured to store reading history of the RFID reading system, and
a camera configured to capture an image of the gaming chip in the area,
wherein the appearance of the gaming chip further expresses the identification information of the gaming chip,
wherein the control device is configured to obtain the identification information expressed in the appearance of the gaming chip by analyzing the image captured by the camera, and
wherein, when the control device has determined that the RFID tag of the gaming chip is broken or the gaming chip does not have a built-in RFID tag, the control device is configured to obtain the reading history stored in the database using the identification information expressed in the appearance of the gaming chip.

25. The inspection system according to claim 18, further comprising:
a multiple placing surface for placing a plurality of gaming chips; and
a second RFID reading system that reads RFID tags of the plurality of gaming chips placed on the multiple placing surface to obtain identification information of the plurality of gaming chips.

26. An inspection system configured to inspect gaming chips having built-in RFID tags storing type information and having the type information expressed on the surface thereof, the inspection system comprising:
a placement area having a plurality of areas for placing the plurality of gaming chips to be inspected one by one, each of the plurality of areas having a size corresponding to a gaming chip;
an RFID reading system configured to read the RFID tags of the gaming chips placed in the plurality of areas and obtain the type information stored in the RFID tags;
a chip recognition system configured to recognize, for each area, a presence or absence of a gaming chip placed in the area, the chip recognition system including a plurality of object detection sensors, each area having a respective object detection sensor of the plurality of object detection sensors;
a control device configured to determine, for each area, a determination result based on the respective type information and the respective recognition result for the area;
the control device configured to determine if there is a fraudulent gaming chip among the gaming chips placed in the plurality of areas of the placing surface;
a display device configured to display, for each area of the plurality of areas, the determination result of the control device for the area,
wherein the control device is configured to determine that there is a fraudulent gaming chip when a plurality of different type information is obtained from the RFID tags of the gaming chips placed in the plurality of areas.

27. The inspection system according to claim 26, wherein:
a plurality of placement areas formed by the plurality of areas in a column direction are provided in a row direction, or the plurality of placement areas formed by the plurality of areas in the row direction are provided in the column direction, and
the control device is configured to determine whether the plurality of different type information is obtained from the RFID tags of the gaming chips placed in the plurality of areas.

28. The inspection system according to claim 26, wherein, when the plurality of different type information is obtained from the RFID tags of the gaming chips placed in the plurality of areas, the control device is configured to determine that the gaming chip placed in an area is the fraudulent gaming chip if the type information obtained from an RFID tag of the gaming chip placed in the area is different from type information obtained from RFID tags of a majority of the gaming chips placed in the plurality of areas.

29. An inspection system for inspecting a plurality of gaming chips having a built-in RFID tag that stores at least type information, the inspection system comprising:
a placing surface having a plurality of areas for placing the plurality of gaming chips to be inspected one by one, each of the plurality of areas having a size corresponding to a gaming chip;
an RFID reading system configured to respectively read the RFID tags of the gaming chips placed on the plurality of areas of the placing surface to obtain the type information; and
a chip recognition system configured to recognize, for each area, a presence or absence of a gaming chip placed in the area, the chip recognition system including a plurality of object detection sensors, each area having a respective object detection sensor of the plurality of object detection sensors;
a control device configured to determine, for each area, a determination result based on the respective type information and the respective recognition result for the area;
the control device configured to determine if there is a fraudulent gaming chip among the gaming chips placed in the plurality of the areas of the placing surface based on the respective reading result and the respective recognition result for the area;
a display device configured to display the type information read by the RFID reading system for each area, wherein:
the display device has a plurality of display areas arranged in a matrix corresponding to arrangement of the plurality of areas; and
each of the plurality of display areas reflects the type information read by the RFID reading system for each of the plurality of areas.

* * * * *